US011095942B2

(12) United States Patent
Loheide et al.

(10) Patent No.: US 11,095,942 B2
(45) Date of Patent: Aug. 17, 2021

(54) RULES-BASED DELIVERY AND PRESENTATION OF NON-PROGRAMMING MEDIA ITEMS AT CLIENT DEVICE

(71) Applicant: Turner Broadcasting System, Inc., Atlanta, GA (US)

(72) Inventors: Donald Jude Loheide, Mableton, GA (US); Matthew Paul Giles, Marietta, GA (US); Gregory Mcclain Stigall, Douglasville, GA (US); Nishith Kumar Sinha, Mableton, GA (US); Cindy Loren Campbell, Atlanta, GA (US); James J Arnzen, Atlanta, GA (US); Nicolas Paul Webb, Mcdonough, GA (US)

(73) Assignee: Turner Broadcasting System, Inc., Atlanta, GA (US)

( * ) Notice: Subject to any disclaimer, the term of this patent is extended or adjusted under 35 U.S.C. 154(b) by 83 days.

(21) Appl. No.: 15/986,406

(22) Filed: May 22, 2018

(65) Prior Publication Data

US 2018/0343484 A1 Nov. 29, 2018

Related U.S. Application Data

(60) Provisional application No. 62/511,190, filed on May 25, 2017.

(51) Int. Cl.
*H04N 21/458* (2011.01)
*H04L 29/08* (2006.01)
(Continued)

(52) U.S. Cl.
CPC ....... *H04N 21/458* (2013.01); *G06Q 30/0242* (2013.01); *G06Q 30/0251* (2013.01);
(Continued)

(58) Field of Classification Search
CPC ......... H04N 21/2393; H04N 21/26241; H04N 21/2668; H04N 21/6587; H04N 21/26208;
(Continued)

(56) References Cited

U.S. PATENT DOCUMENTS 3,751,581 A 8/1973 Sakata et al.
4,500,930 A 2/1985 Hamalainen et al.
(Continued)

OTHER PUBLICATIONS

Advisory Action for U.S. Appl. No. 15/396,475 dated Jun. 3, 2019.
(Continued)

*Primary Examiner* — Nasser M Goodarzi
*Assistant Examiner* — Patrick A Ryan
(74) *Attorney, Agent, or Firm* — Chip Law Group

(57) ABSTRACT

A media presentation and distribution system (MPDS) that handles rules-based presentation of non-programming media items, receives a user request (which includes user parameters) for delivery of programming media content at a first client device and transmits a media stream that includes the programming media content with a plurality of identifiers present with the programming media content. The MPDS further receives a request that includes one or more user preferences from the first client device, based on a detection of the plurality of identifiers. The MPDS further determines a set of non-programming media items for delivery to first client device based on the user parameters, targeting parameters, goals associated with a non-programming media item. The MPDS further generates rules and constraints information for non-programming media items and instructs a delivery of the set of non-programming media items and the rules and constraints information to first client device.

27 Claims, 10 Drawing Sheets

US 11,095,942 B2

Page 2

(51) Int. Cl.

| | |
|---|---|
| *H04N 21/431* | (2011.01) |
| *H04N 21/81* | (2011.01) |
| *G06Q 30/02* | (2012.01) |
| *H04L 29/06* | (2006.01) |
| *H04N 21/478* | (2011.01) |
| *H04N 21/233* | (2011.01) |
| *H04N 21/234* | (2011.01) |
| *H04N 21/2387* | (2011.01) |
| *H04N 21/2389* | (2011.01) |
| *H04N 21/8545* | (2011.01) |
| *G06Q 30/06* | (2012.01) |
| *H04N 21/2543* | (2011.01) |
| *H04N 21/44* | (2011.01) |
| *H04N 21/845* | (2011.01) |
| *H04N 21/235* | (2011.01) |
| *H04N 21/258* | (2011.01) |
| *H04N 21/435* | (2011.01) |
| *H04N 21/6332* | (2011.01) |
| *H04N 21/266* | (2011.01) |
| *H04N 21/84* | (2011.01) |
| *H04N 21/239* | (2011.01) |
| *H04N 21/262* | (2011.01) |
| *H04N 21/2668* | (2011.01) |
| *H04N 21/6587* | (2011.01) |
| *H04L 9/32* | (2006.01) |
| *H04N 21/24* | (2011.01) |
| *H04N 21/472* | (2011.01) |
| *H04N 21/835* | (2011.01) |
| *H04H 20/10* | (2008.01) |
| *H04N 21/8358* | (2011.01) |

(52) U.S. Cl.
CPC ..... *G06Q 30/0275* (2013.01); *G06Q 30/0633* (2013.01); *H04L 9/32* (2013.01); *H04L 65/4084* (2013.01); *H04L 65/60* (2013.01); *H04L 67/1097* (2013.01); *H04L 67/125* (2013.01); *H04L 67/16* (2013.01); *H04L 67/306* (2013.01); *H04L 67/32* (2013.01); *H04L 67/42* (2013.01); *H04N 21/233* (2013.01); *H04N 21/2353* (2013.01); *H04N 21/2387* (2013.01); *H04N 21/2393* (2013.01); *H04N 21/23418* (2013.01); *H04N 21/23424* (2013.01); *H04N 21/23892* (2013.01); *H04N 21/24* (2013.01); *H04N 21/2543* (2013.01); *H04N 21/25883* (2013.01); *H04N 21/25891* (2013.01); *H04N 21/266* (2013.01); *H04N 21/2668* (2013.01); *H04N 21/26208* (2013.01); *H04N 21/26241* (2013.01); *H04N 21/435* (2013.01); *H04N 21/4312* (2013.01); *H04N 21/4316* (2013.01); *H04N 21/44008* (2013.01); *H04N 21/44016* (2013.01); *H04N 21/47217* (2013.01); *H04N 21/47815* (2013.01); *H04N 21/6332* (2013.01); *H04N 21/6587* (2013.01); *H04N 21/812* (2013.01); *H04N 21/835* (2013.01); *H04N 21/84* (2013.01); *H04N 21/845* (2013.01); *H04N 21/8545* (2013.01); *G06Q 2220/00* (2013.01); *H04H 20/10* (2013.01); *H04N 21/8358* (2013.01)

(58) Field of Classification Search
CPC ............. H04N 21/24; H04N 21/47217; H04N 21/835; H04N 21/233; H04N 21/23424; H04N 21/2387; H04N 21/23892; H04N 21/4312; H04N 21/8545; H04N 21/23418; H04N 21/44008; H04N 21/2543; H04N 21/845; H04N 21/2353; H04N 21/25891; H04N 21/435; H04N 21/6332; H04N 21/44016; H04N 21/266; H04N 21/84; H04N 21/458; H04N 21/4316; H04N 21/812; H04N 21/25883; H04N 21/8385; H04N 21/32; H04L 19/32; H04L 67/306; H04L 67/16; H04L 67/125; H04L 67/32; H04L 65/60; G06Q 30/0633; G06Q 30/0251; G06Q 30/0242; G06Q 30/0275; G06Q 2220/00

See application file for complete search history.

(56) References Cited

U.S. PATENT DOCUMENTS

| | | | |
|---|---|---|---|
| 5,294,981 A | 3/1994 | Yazolino et al. | |
| 6,229,524 B1 | 5/2001 | Chernock et al. | |
| 6,378,129 B1 | 4/2002 | Zetts | |
| 6,434,621 B1 | 8/2002 | Pezzillo et al. | |
| 6,625,811 B1 | 9/2003 | Kaneko | |
| 6,701,355 B1 | 3/2004 | Brandt et al. | |
| 6,727,914 B1 | 4/2004 | Gutta | |
| 7,051,352 B1 | 5/2006 | Schaffer | |
| 7,337,458 B2 | 2/2008 | Michelitsch et al. | |
| 7,380,262 B2 | 5/2008 | Wang et al. | |
| 7,581,237 B1 | 8/2009 | Kurapati | |
| 7,840,980 B2 | 11/2010 | Gutta | |
| 7,985,134 B2 | 7/2011 | Ellis | |
| 8,005,826 B1 | 8/2011 | Sahami et al. | |
| 8,099,757 B2 * | 1/2012 | Riedl ............... | H04N 21/2385 725/116 |
| 8,132,203 B2 * | 3/2012 | de Heer ............ | H04N 7/17318 725/32 |
| 8,533,761 B1 | 9/2013 | Sahami et al. | |
| 8,572,649 B1 | 10/2013 | Gossweiler et al. | |
| 8,578,042 B2 | 11/2013 | Hu et al. | |
| 8,631,440 B2 | 1/2014 | Gossweiler et al. | |
| 8,826,443 B1 | 9/2014 | Raman et al. | |
| 8,842,879 B2 | 9/2014 | Laksono et al. | |
| 8,843,965 B1 | 9/2014 | Kurapati et al. | |
| 8,954,521 B1 | 2/2015 | Faaborg et al. | |
| 9,094,639 B2 | 7/2015 | Yim et al. | |
| 9,130,918 B2 | 9/2015 | Picconi et al. | |
| 9,342,668 B2 | 5/2016 | Wang et al. | |
| 9,380,264 B1 | 6/2016 | Vakalapudi | |
| 9,390,447 B1 | 7/2016 | Smith | |
| 10,075,753 B2 | 9/2018 | Loheide et al. | |
| 2002/0038457 A1 | 3/2002 | Numata et al. | |
| 2002/0178447 A1 | 11/2002 | Plotnick et al. | |
| 2003/0023757 A1 | 1/2003 | Ishioka et al. | |
| 2003/0026628 A1 | 2/2003 | Arimoto | |
| 2003/0051239 A1 | 3/2003 | Hudspeth | |
| 2003/0110507 A1 | 6/2003 | Dimitrova et al. | |
| 2003/0126600 A1 | 7/2003 | Heuvelman | |
| 2003/0151538 A1 | 8/2003 | Escobosa et al. | |
| 2003/0182658 A1 | 9/2003 | Alexander | |
| 2003/0212708 A1 | 11/2003 | Potrebic et al. | |
| 2003/0236832 A1 | 12/2003 | McIntyre et al. | |
| 2004/0022278 A1 | 2/2004 | Thomas et al. | |
| 2004/0031056 A1 | 2/2004 | Wolff | |
| 2004/0128682 A1 | 7/2004 | Liga et al. | |
| 2004/0163103 A1 | 8/2004 | Swix et al. | |
| 2004/0172650 A1 | 9/2004 | Hawkins et al. | |
| 2005/0015816 A1 | 1/2005 | Christofalo et al. | |
| 2005/0060745 A1 * | 3/2005 | Riedl ..................... | G06Q 30/02 725/42 |
| 2005/0096978 A1 * | 5/2005 | Black ..................... | G06Q 30/02 705/14.55 |
| 2005/0120369 A1 | 6/2005 | Matz | |
| 2005/0132401 A1 | 6/2005 | Boccon-Gibod et al. | |
| 2005/0135613 A1 | 6/2005 | Brandenburg et al. | |
| 2006/0031889 A1 | 2/2006 | Bennett et al. | |
| 2006/0064730 A1 | 3/2006 | Rael et al. | |
| 2006/0122916 A1 | 6/2006 | Kassan | |
| 2006/0287915 A1 | 12/2006 | Boulet et al. | |
| 2007/0011718 A1 | 1/2007 | Nee | |
| 2007/0033419 A1 | 2/2007 | Kocher et al. | |

(56) References Cited

U.S. PATENT DOCUMENTS

| | | |
|---|---|---|
| 2007/0186228 A1 | 8/2007 | Ramaswamy et al. |
| 2007/0238035 A1 | 10/2007 | Holscher et al. |
| 2007/0250901 A1 | 10/2007 | McIntire et al. |
| 2008/0086742 A1 | 4/2008 | Aldrey et al. |
| 2008/0201735 A1 | 8/2008 | Sumiyoshi et al. |
| 2008/0271078 A1 | 10/2008 | Gossweiler et al. |
| 2008/0271080 A1 | 10/2008 | Gossweiler et al. |
| 2008/0320513 A1 | 12/2008 | Wong et al. |
| 2009/0070808 A1 | 3/2009 | Jacobs |
| 2009/0070819 A1 | 3/2009 | Gajda et al. |
| 2009/0100452 A1 | 4/2009 | Kludgeons et al. |
| 2009/0254934 A1 | 10/2009 | Grammens |
| 2009/0256972 A1 | 10/2009 | Ramaswamy et al. |
| 2009/0285217 A1 | 11/2009 | Frink et al. |
| 2009/0287790 A1 | 11/2009 | Upton et al. |
| 2010/0010899 A1* | 1/2010 | Lambert ............ G06Q 30/0267 |
| | | 705/14.58 |
| 2010/0125880 A1 | 5/2010 | Roewe |
| 2010/0146548 A1 | 6/2010 | Yim et al. |
| 2010/0146559 A1 | 6/2010 | Lee et al. |
| 2010/0169914 A1 | 7/2010 | Williamson et al. |
| 2010/0287297 A1 | 11/2010 | Lefebvre |
| 2010/0325655 A1 | 12/2010 | Perez |
| 2010/0325657 A1 | 12/2010 | Sellers et al. |
| 2011/0022471 A1 | 1/2011 | Brueck et al. |
| 2011/0052144 A1 | 3/2011 | Abbas et al. |
| 2011/0123062 A1 | 5/2011 | Hilu |
| 2011/0153464 A1 | 6/2011 | Hendricks et al. |
| 2011/0161500 A1 | 6/2011 | Yengalasetti et al. |
| 2011/0164115 A1 | 7/2011 | Bennett et al. |
| 2011/0177775 A1 | 7/2011 | Gupta et al. |
| 2011/0209181 A1 | 8/2011 | Gupta et al. |
| 2011/0238754 A1 | 9/2011 | Dasilva et al. |
| 2011/0246202 A1 | 10/2011 | McMillan et al. |
| 2012/0017282 A1 | 1/2012 | Kang et al. |
| 2012/0110621 A1 | 5/2012 | Gossweiler |
| 2012/0143693 A1 | 6/2012 | Chung et al. |
| 2012/0192232 A1 | 7/2012 | Ellis |
| 2012/0271942 A1 | 10/2012 | Walker et al. |
| 2012/0272264 A1 | 10/2012 | Suzuki et al. |
| 2012/0284737 A1 | 11/2012 | Savoor et al. |
| 2012/0304223 A1 | 11/2012 | Sargent et al. |
| 2013/0121487 A1 | 5/2013 | Lorberbaum et al. |
| 2013/0160051 A1 | 6/2013 | Armstrong et al. |
| 2013/0198328 A1 | 8/2013 | Green et al. |
| 2013/0205212 A1 | 8/2013 | Sinha et al. |
| 2013/0208811 A1 | 8/2013 | Liu et al. |
| 2013/0227283 A1 | 8/2013 | Williamson et al. |
| 2013/0227284 A1 | 8/2013 | Pfeffer et al. |
| 2013/0263168 A1 | 10/2013 | Choi |
| 2013/0263182 A1* | 10/2013 | Ivy ....................... H04N 21/458 |
| | | 725/34 |
| 2013/0276023 A1 | 10/2013 | Kent et al. |
| 2013/0305287 A1 | 11/2013 | Wong et al. |
| 2013/0312041 A1 | 11/2013 | Gresta |
| 2013/0325605 A1 | 12/2013 | Callaghan et al. |
| 2014/0013354 A1* | 1/2014 | Johnson ................. G06Q 30/02 |
| | | 725/35 |
| 2014/0020017 A1* | 1/2014 | Stern ................ H04N 21/23611 |
| | | 725/34 |
| 2014/0032259 A1 | 1/2014 | LaFever et al. |
| 2014/0033240 A1 | 1/2014 | Card |
| 2014/0071818 A1 | 3/2014 | Wang et al. |
| 2014/0143806 A1 | 5/2014 | Steinberg et al. |
| 2014/0150019 A1 | 5/2014 | Ma et al. |
| 2014/0152894 A1 | 6/2014 | Childs et al. |
| 2014/0157312 A1 | 6/2014 | Williams et al. |
| 2014/0173666 A1 | 6/2014 | Gordon et al. |
| 2014/0189514 A1 | 7/2014 | Hilliard |
| 2014/0189743 A1 | 7/2014 | Kennedy et al. |
| 2014/0189754 A1 | 7/2014 | Major et al. |
| 2014/0237243 A1 | 8/2014 | Ma et al. |
| 2014/0282723 A1 | 9/2014 | Sinha et al. |
| 2014/0310745 A1 | 10/2014 | Canney et al. |
| 2014/0317666 A1 | 10/2014 | Chiarulli et al. |
| 2014/0351843 A1 | 11/2014 | Theriault |
| 2014/0359656 A1 | 12/2014 | Banica et al. |
| 2014/0366068 A1 | 12/2014 | Burkitt et al. |
| 2015/0012926 A1 | 1/2015 | Wei et al. |
| 2015/0033255 A1 | 1/2015 | Neumann et al. |
| 2015/0058874 A1 | 2/2015 | Sun et al. |
| 2015/0074732 A1 | 3/2015 | Green et al. |
| 2015/0106856 A1 | 4/2015 | Rankine |
| 2015/0127845 A1 | 5/2015 | Phillips et al. |
| 2015/0237386 A1 | 8/2015 | Sheehan et al. |
| 2015/0237389 A1 | 8/2015 | Grouf et al. |
| 2015/0249865 A1 | 9/2015 | Oliveira |
| 2015/0271234 A1 | 9/2015 | O'Malley et al. |
| 2015/0289022 A1 | 10/2015 | Gross |
| 2015/0382042 A1 | 12/2015 | Wagenaar et al. |
| 2015/0382047 A1 | 12/2015 | Os et al. |
| 2015/0382274 A1 | 12/2015 | Logvinov et al. |
| 2016/0029055 A1 | 1/2016 | Nunez et al. |
| 2016/0063530 A1 | 3/2016 | Lin |
| 2016/0073155 A1 | 3/2016 | Subramaniam et al. |
| 2016/0112740 A1 | 4/2016 | Francisco et al. |
| 2016/0127786 A1 | 5/2016 | Langer |
| 2016/0127788 A1 | 5/2016 | Roberts et al. |
| 2016/0150290 A1 | 5/2016 | Chandler et al. |
| 2016/0182954 A1 | 6/2016 | Nguyen et al. |
| 2016/0198202 A1 | 7/2016 | Brandenburg et al. |
| 2016/0227260 A1 | 8/2016 | Hundemer et al. |
| 2016/0255391 A1 | 9/2016 | Noble |
| 2016/0308958 A1 | 10/2016 | Navali et al. |
| 2016/0316247 A1 | 10/2016 | Biagini et al. |
| 2017/0064400 A1 | 3/2017 | Riegel et al. |
| 2017/0070789 A1 | 3/2017 | Liassides et al. |
| 2017/0085935 A1 | 3/2017 | Riedel et al. |
| 2017/0099506 A1 | 4/2017 | Grover |
| 2017/0099525 A1 | 4/2017 | Ray et al. |
| 2017/0171610 A1 | 6/2017 | Nair et al. |
| 2017/0193544 A1 | 7/2017 | Glasgow et al. |
| 2017/0195718 A1 | 7/2017 | Nair et al. |
| 2017/0201779 A1 | 7/2017 | Publicover et al. |
| 2017/0238035 A1 | 8/2017 | Perez |
| 2017/0289597 A1 | 10/2017 | Riedel et al. |
| 2018/0007060 A1 | 1/2018 | Leblang et al. |
| 2018/0048599 A1 | 2/2018 | Arghandiwal et al. |
| 2018/0131986 A1 | 5/2018 | Cole et al. |
| 2018/0165650 A1 | 6/2018 | Kashyape et al. |
| 2018/0184047 A1 | 6/2018 | Simonsen et al. |
| 2018/0300751 A1 | 10/2018 | Hammitt et al. |
| 2018/0343505 A1 | 11/2018 | Loheide et al. |
| 2020/0244778 A1 | 7/2020 | Berookhim et al. |

OTHER PUBLICATIONS

Advisory Action for U.S. Appl. No. 15/988,308 dated Jul. 16, 2019.
Advisory Action for U.S. Appl. No. 15/986,218 dated Jul. 12, 2019.
Corrected Notice of Allowance for U.S. Appl. No. 15/396,453 dated Jun. 3, 2019.
Corrected Notice of Allowance for U.S. Appl. No. 15/396,453 dated Aug. 21, 2019.
Corrected Notice of Allowance in U.S. Appl. No. 15/396,453 dated Jun. 13, 2019.
Final Office Action for U.S. Appl. No. 15/396,614 dated Aug. 12, 2019.
Non-Final Office Action for U.S. Appl. No. 15/986,361 dated Jul. 11, 2019.
Non-Final Office Action for U.S. Appl. No. 15/986,451 dated Jun. 27, 2019.
Non-final Office Action for U.S. Appl. No. 15/988,241 dated Jun. 27, 2019.
Non-Final Office Action for U.S. Appl. No. 15/396,475 dated Aug. 8, 2019.
Non-Final Office Action for U.S. Appl. No. 16/128,104 dated Aug. 21, 2019.
Notice of Allowance for U.S. Appl. No. 15/396,624 dated May 31, 2019.
Supplemental Notice of Allowance for U.S. Appl. No. 15/396,624 dated Aug. 14, 2019.

(56) References Cited

OTHER PUBLICATIONS

Advisory Action in U.S. Appl. No. 15/396,453 dated Apr. 20, 2018.
Advisory Action in U.S. Appl. No. 15/396,468 dated Jan. 7, 2019.
Advisory Action in U.S. Appl. No. 15/396,475 dated Sep. 20, 2018.
Advisory Action in U.S. Appl. No. 15/396,614 dated Mar. 16, 2018.
Corrected Notice of Allowance in U.S. Appl. No. 15/396,462 dated Aug. 8, 2018.
Corrected Notice of Allowance in U.S. Appl. No. 15/396,462 dated Jul. 11, 2018.
Final Office Action in U.S. Appl. No. 15/396,468 dated Nov. 15, 2018.
Final Office Action in U.S. Appl. No. 15/396,475 dated Jul. 12, 2018.
Final Office Action in U.S. Appl. No. 15/396,614 dated Oct. 25, 2018.
Final Office Action in U.S. Appl. No. 15/396,624 dated Jan. 24, 2019.
Non-Final Office Action in U.S. Appl. No. 15/396,453 dated Jun. 14, 2018.
Non-Final Office Action in U.S. Appl. No. 15/396,468 dated Jul. 3, 2018.
Non-Final Office Action in U.S. Appl. No. 15/396,475 dated Nov. 30, 2018.
Non-Final Office Action in U.S. Appl. No. 15/396,614 dated May 18, 2018.
Non-Final Office Action in U.S. Appl. No. 15/396,624 dated Jul. 13, 2018.
Non-Final Office Action in U.S. Appl. No. 15/986,218 dated Nov. 28, 2018.
Notice of Allowance in U.S. Appl. No. 15/396,453 dated Jan. 10, 2019.
Notice of Allowance in U.S. Appl. No. 15/396,462 dated Jun. 1, 2018.
Notice of Allowance in U.S. Appl. No. 15/396,462 dated May 15, 2018.
Office Action in U.S. Appl. No. 15/396,468 dated Jan. 26, 2018.
Office Action in U.S. Appl. No. 15/396,453 dated Feb. 27, 2018.
Office Action in U.S. Appl. No. 15/396,475 dated Mar. 29, 2018.
Final Office Action for U.S. Appl. No. 15/986,218 dated Apr. 24, 2019.
Final Office Action for U.S. Appl. No. 15/988,308 dated May 9, 2019.
Final Office Action in U.S. Appl. No. 15/396,475 dated Feb. 25, 2019.
Non-Final Office Action in U.S. Appl. No. 15/396,614 dated Mar. 7, 2019.
Non-Final Office Action in U.S. Appl. No. 15/396,468 dated Mar. 1, 2019.
Advisory Action for U.S. Appl. No. 15/396,614 dated Oct. 24, 2019.
Corrected Notice of Allowance for U.S. Appl. No. 15/396,624 dated Sep. 5, 2019.
Final Office Action for U.S. Appl. No. 15/396,468 dated Nov. 6, 2019.
Non-Final Office Action for U.S. Appl. No. 15/396,624 dated Oct. 16, 2019.
Non-Final Office Action for U.S. Appl. No. 15/986,218 dated Sep. 27, 2019.
Non-Final Office Action for U.S. Appl. No. 15/986,286 dated Nov. 29, 2019.
Non-Final Office Action for U.S. Appl. No. 15/988,308 dated Dec. 3, 2019.
Non-Final Office Action for U.S. Appl. No. 16/229,310 dated Nov. 29, 2019.
Advisory Action for U.S. Appl. No. 15/396,468 dated Jan. 16, 2020.
Advisory Action for U.S. Appl. No. 15/986,361 dated Feb. 26, 2020.
Advisory Action for U.S. Appl. No. 15/986,451 dated Feb. 20, 2020.
Final Office Action for U.S. Appl. No. 15/396,475 dated Feb. 4, 2020.
Final Office Action for U.S. Appl. No. 15/986,218 dated Jan. 31, 2020.
Final Office Action for U.S. Appl. No. 15/986,361 dated Dec. 23, 2019.
Final Office Action for U.S. Appl. No. 15/986,451 dated Dec. 16, 2019.
Final Office Action for U.S. Appl. No. 15/988,241 dated Jan. 8, 2020.
Non-Final Office Action for U.S. Appl. No. 15/396,468 dated Feb. 4, 2020.
Non-Final Office Action for U.S. Appl. No. 15/986,406 dated Dec. 18, 2019.
Non-Final Office Action for U.S. Appl. No. 15/988,472 dated Dec. 27, 2019.
Non-Final Office Action for U.S. Appl. No. 15/988,492 dated Feb. 18, 2020.
Non-Final Office Action for U.S. Appl. No. 16/229,497 dated Dec. 12, 2019.
Non-Final Office Action for U.S. Appl. No. 16/230,268 dated Jan. 8, 2020.
Non-Final Office Action for U.S. Appl. No. 16/234,870 dated Jan. 9, 2020.
Non-Final Office Action for U.S. Appl. No. 16/236,673 dated Jan. 10, 2020.
Notice of Allowance for U.S. Appl. No. 16/128,104 dated Dec. 12, 2019.
Restriction Requirement for U.S. Appl. No. 16/231,467 dated Feb. 5, 2020.
Advisory Action for U.S. Appl. No. 15/396,475 dated May 13, 2020.
Corrected Notice of Allowance for U.S. Appl. No. 15/988,241 dated May 8, 2020.
Corrected Notice of Allowance for U.S. Appl. No. 16/128,104 dated Apr. 15, 2020.
Corrected Notice of Allowance for U.S. Appl. No. 16/128,104 dated May 20, 2020.
Final Office Action for U.S. Appl. No. 15/988,308 dated May 6, 2020.
Final Office Action for U.S. Appl. No. 15/986,286 dated Jun. 9, 2020.
Final Office Action for U.S. Appl. No. 15/988,492 dated May 28, 2020.
Final Office Action for U.S. Appl. No. 16/229,310 dated Jun. 11, 2020.
Final Office Action for U.S. Appl. No. 16/229,497 dated Jun. 11, 2020.
Final Office Action for U.S. Appl. No. 16/230,268 dated Apr. 17, 2020.
Non-Final Office Action for U.S. Appl. No. 15/986,451 dated Apr. 16, 2020.
Non-Final Office Action for U.S. Appl. No. 16/229,614 dated Mar. 19, 2020.
Non-Final Office Action for U.S. Appl. No. 16/235,445 dated Apr. 2, 2020.
Non-Final Office Action for U.S. Appl. No. 16/236,713 dated May 29, 2020.
Notice of Allowability for U.S. Appl. No. 15/986,361 dated May 15, 2020.
Notice of Allowance for U.S. Appl. No. 15/986,361 dated Apr. 8, 2020.
Notice of Allowance for U.S. Appl. No. 15/988,241 dated Mar. 18, 2020.
Notice of Allowance for U.S. Appl. No. 16/231,467 dated Apr. 16, 2020.
Notice of Allowance in U.S. Appl. No. 16/236,673 dated May 1, 2020.
Corrected Notice of Allowance for U.S. Appl. No. 15/988,241 dated Aug. 13, 2020.
Corrected Notice of Allowance for U.S. Appl. No. 15/988,241 dated Jun. 22, 2020.
Corrected Notice of Allowance for U.S. Appl. No. 16/128,104 dated Jul. 8, 2020.
Corrected Notice of Allowance for U.S. Appl. No. 16/236,673 dated Sep. 21, 2020.

(56) References Cited

OTHER PUBLICATIONS

Final Office Action for U.S. Appl. No. 15/988,572 dated Jul. 2, 2020.
Final Office Action for U.S. Appl. No. 16/229,614 dated Jul. 9, 2020.
Final Office Action for U.S. Appl. No. 16/234,870 dated Jul. 9, 2020.
Final Office Action for U.S. Appl. No. 16/235,445 dated Sep. 3, 2200.
Non-Final Office Action for U.S. Appl. No. 15/396,475 dated Aug. 6, 2020.
Non-Final Office Action for U.S. Appl. No. 15/988,308 dated Sep. 8, 2020.
Non-Final Office Action for U.S. Appl. No. 15/988,492 dated Sep. 10, 2020.
Notice of Allowability for U.S. Appl. No. 15/986,361 dated Aug. 18, 2020.
Notice of Allowability for U.S. Appl. No. 15/986,361 dated Jul. 14, 2020.
Notice of Allowance for U.S. Appl. No. 15/986,218 dated Jul. 13, 2020.
Notice of Allowance for U.S. Appl. No. 15/988,241 dated Aug. 26, 2020.
Notice of Allowance for U.S. Appl. No. 16/230,268 dated Aug. 24, 2020.
Notice of Allowance for U.S. Appl. No. 16/234,870 dated Aug. 19, 2020.
Corrected Notice of Allowance for U.S. Appl. No. 15/988,241 dated Nov. 18, 2020.
Corrected Notice of Allowance for U.S. Appl. No. 16/230,268 dated Dec. 2, 2020.
Corrected Notice of Allowance for U.S. Appl. No. 16/230,268 dated Oct. 9, 2020.
Corrected Notice of Allowance for U.S. Appl. No. 16/231,467 dated Nov. 20, 2020.
Corrected Notice of Allowance for U.S. Appl. No. 16/231,467 dated Oct. 1, 2020.
Corrected Notice of Allowance for U.S. Appl. No. 16/236,673 dated Oct. 23, 2020.
Final Office Action for U.S. Appl. No. 15/986,451 dated Sep. 29, 2020.
Final Office Action for U.S. Appl. No. 16/236,713 dated Sep. 30, 2020.
Non-Final Office Action for U.S. Appl. No. 15/988,572 dated Nov. 6, 2020.
Non-Final Office Action for U.S. Appl. No. 16/902,775 dated Oct. 5, 2020.
Notice of Allowability for U.S. Appl. No. 15/986,361 dated Sep. 30, 2020.
Notice of Allowance for U.S. Appl. No. 16/229,310 dated Dec. 14, 2020.
Notice of Allowance for U.S. Appl. No. 16/235,445 dated Nov. 4, 2020.
Notice of Allowance for U.S. Appl. No. 16/236,713 dated Nov. 18, 2020.
Corrected Notice of Allowance for U.S. Appl. No. 16/234,870 dated Feb. 24, 2021.
Corrected Notice of Allowance for U.S. Appl. No. 16/234,870 dated Jan. 15, 2021.
Corrected Notice of Allowance for U.S. Appl. No. 16/235,445 dated Mar. 26, 2021.
Final Office Action for U.S. Appl. No. 15/396,468 dated Feb. 10, 2021.
Final Office Action for U.S. Appl. No. 15/988,308 dated Jan. 28, 2021.
Final Office Action for U.S. Appl. No. 15/988,492 dated Jan. 6, 2021.
Non-Final Office Action for U.S. Appl. No. 16/854,970 dated Mar. 17, 2021.
Notice of Allowance for U.S. Appl. No. 15/396,475 dated Feb. 5, 2021.
Notice of Allowance for U.S. Appl. No. 16/229,497 dated Dec. 30, 2020.
Notice of Allowance for U.S. Appl. No. 16/229,614 dated Feb. 18, 2021.
Notice of Allowance for U.S. Appl. No. 16/230,493 dated Feb. 12, 2021.
Notice of Allowance for U.S. Appl. No. 16/902,775 dated Feb. 2, 2021.
Supplemental Notice of Allowance for U.S. Appl. No. 15/986,218 dated Jan. 27, 2021.
Corrected Notice of Allowance for U.S. Appl. No. 15/986,286 dated May 27, 2021.
Corrected Notice of Allowance for U.S. Appl. No. 16/229,310 dated Apr. 27, 2021.
Corrected Notice of Allowance for U.S. Appl. No. 16/236,713 dated Apr. 8, 2021.
Corrected Notice of Allowance for U.S. Appl. No. 16/236,713 dated May 17, 2021.
Corrected Notice of Allowance for U.S. Appl. No. 16/902,775 dated Apr. 26, 2021.
Corrected Notice of Allowance for U.S. Appl. No. 16/902,775 dated Apr. 9, 2021.
Final Office Action for U.S. Appl. No. 15/988,572 dated May 12, 2021.
Non-Final Office Action for U.S. Appl. No. 15/988,492 dated Apr. 14, 2021.
Notice of Allowance for U.S. Appl. No. 15/986,451 dated May 5, 2021.
Non-Final Office Action for U.S. Appl. No. 15/396,468 dated Jun. 1, 2021.
Corrected Notice of Allowance for U.S. Appl. No. 16/229,614 dated Jun. 29, 2021.
Corrected Notice of Allowance for U.S. Appl. No. 16/902,774 dated Jun. 11, 2021.
Non-Final Office Action for U.S. Appl. No. 17/038,323 dated Jul. 1, 2021.

* cited by examiner

RULES-BASED DELIVERY AND PRESENTATION OF NON-PROGRAMMING MEDIA ITEMS AT CLIENT DEVICE

CROSS-REFERENCE TO RELATED APPLICATIONS/INCORPORATION BY REFERENCE

This application makes reference to, and claims priority to, and claims benefit from U.S. Application Ser. No. 62/511,190, which was filed on May 25, 2017.

This Application also makes reference to:

U.S. application Ser. No. 15/986,361, filed on May 22, 2018;

U.S. application Ser. No. 15/988,241, filed on May 24, 2018; and

U.S. application Ser. No. 15/986,218, filed on May 22, 2018.

Each of the above stated patent applications is hereby incorporated herein by reference in its entirety.

FIELD OF TECHNOLOGY

Certain embodiments of the disclosure relate to scheduling and packaging system. More specifically, certain embodiments of the disclosure relate to a method and system for rules-based delivery of non-programming media items to different client devices for rules-based presentation of the non-programming media items at the different client devices.

BACKGROUND

Typically, media distribution sources are configured to deliver programming media content, such as linear feed or live video video-on-demand (VOD) items, to various consumer devices in a content delivery network. The delivery of such programming media content is in accordance with a programming schedule that ensures an adequate or a maximum utilization of airtime. The programming schedule defines what and when to broadcast to the consumer devices, based on which the programming media content is packaged and distributed via channels to the consumer devices via the content delivery network.

The media distribution sources also package non-programming media items in the programming media content. Along with the programming media content, the distribution of the non-programming media items may facilitate economic growth of brands associated with various products and/or services. In certain scenarios, the user associated with a consumer device may desire not to receive and/or engage with the non-programming media items while viewing the programming media content, such as a movie. In existing systems, various control elements may be provided on the consumer device. The user may interact with the consumer device through various options to control, for example, skip the received non-programming media items. However, such systems may lack a support system to manage delivery of the non-programming media items on the consumer device when the user has provided specific preferences for the non-programming media items, for example, a preference to defer an advertisement that is being played on the consumer device. Thus, a lack of such support systems may affect a seamless user experience in terms of user's engagement with the programming media content and the non-programming media content. The lack of such support systems may further lead to a reduced likelihood of continued engagement of the user (associated with the consumer device) with the programming media content, which may lead to an increased churn rate for the content provider or other ad-based third party network.

Further limitations and disadvantages of conventional and traditional approaches will become apparent to one of skill in the art, through comparison of such systems with some aspects of the present disclosure as set forth in the remainder of the present application with reference to the drawings.

BRIEF SUMMARY OF THE DISCLOSURE

A system and/or a method is provided for rules-based delivery of non-programming media items to different client devices for rules-based presentation of the non-programming media items at the different client devices, substantially as shown in and/or described in connection with at least one of the figures, as set forth more completely in the claims.

These and other advantages, aspects and novel features of the present disclosure, as well as details of an illustrated embodiment thereof, will be more fully understood from the following description and drawings.

DETAILED DESCRIPTION OF THE DISCLOSURE

Figure 1:
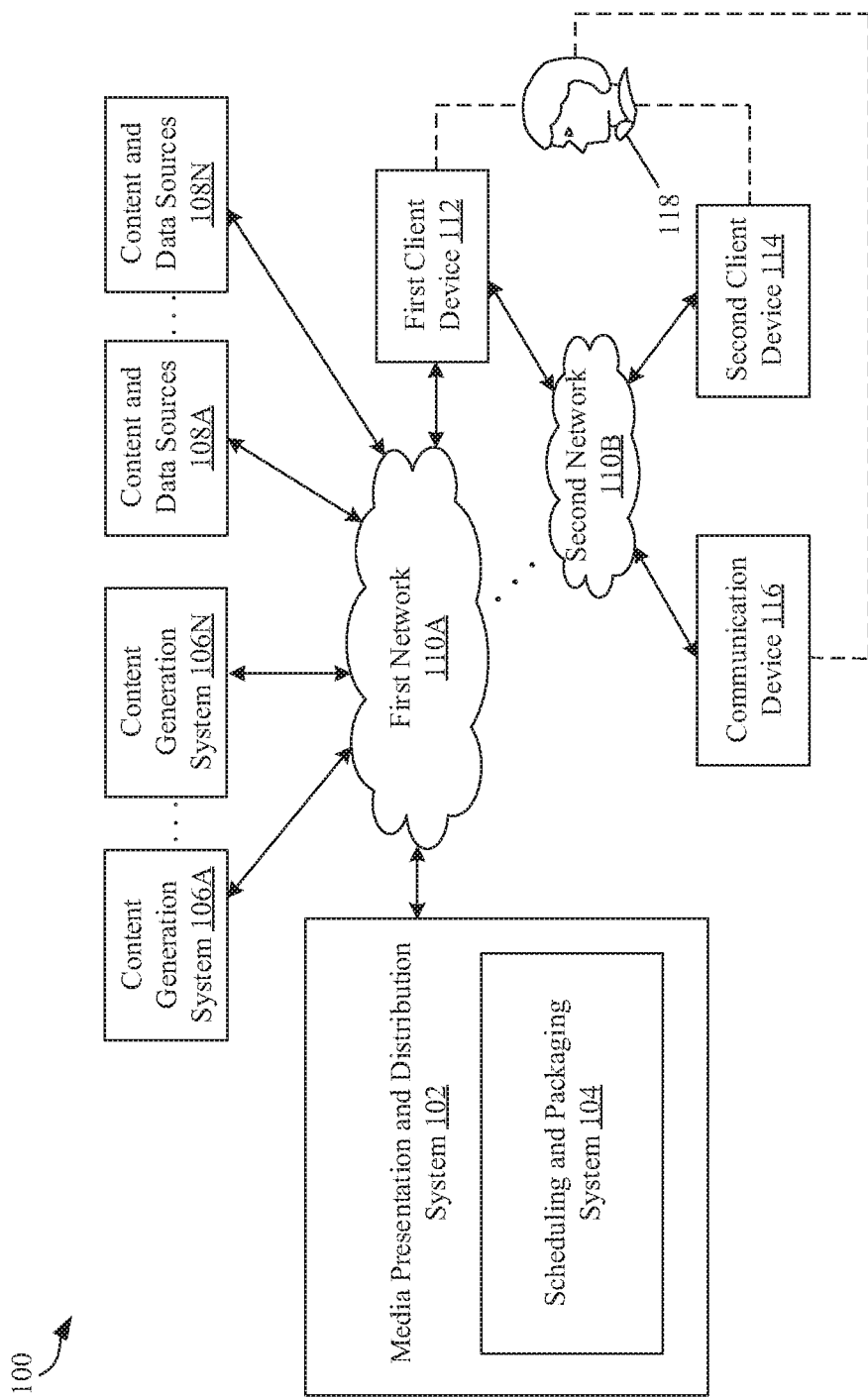
FIG. 1 is a block diagram that illustrates exemplary system for handling rules-based delivery and presentation of non-programming media items at a first client device or a second client device paired with the first client device, in accordance with an exemplary embodiment of the disclosure.

Certain embodiments of the disclosure may be found in a system and method that handles rules-based delivery and presentation of non-programming media items at a first client device or a second client device that is paired with the first client device. In one aspect, various embodiments of the disclosure provide a media presentation and distribution system that may include at least one circuit (hereinafter, "circuitry" that handles server-side rules-based delivery and presentation of non-programming media items along with the programming media content.

The circuitry may be configured to receive a user request for delivery of programming media content at the first client device. The user request may include one or more user parameters (hereinafter, "user parameters"). The user request is generated in response to a user input. The circuitry may be further configured to transmit a media stream that includes the programming media content along with a plurality of identifiers. In some cases, the plurality of identifiers may be embedded within the programming media content. In some other cases, the plurality of identifiers may not be embedded within the programming media content, and may be send separate to the programming media content. The transmitted media stream may be based on a programming schedule generated based on the received user request. The plurality of identifiers in the media stream may correspond to a plurality of metadata triggers. The plurality of identifiers indicates a plurality of insertion points in the programming media content. The plurality of identifiers may be transmitted via at least one of in-stream in the media stream or out-of-band beacons that employ an audio segment, a video segment, or recognizable content that represents the plurality of identifiers.

The circuitry may be further configured to receive a request that includes the user parameters from the first client device. The request is automatically generated by the first client device based on a detection of the plurality of identifiers during presentation of the programming media content at the first client device. The circuitry may be further configured to determine a set of non-programming media items for delivery to first client device based on the user parameters, at least one targeting parameter (hereinafter, "targeting parameters"), and at least one goal (hereinafter, "goals") associated with a non-programming media item. The circuitry is further configured to generate rules and constraints Information that determines presentation of one or more non-programming media items of the determined set of non-programming media items. Thereafter, the circuitry may be further configured to instruct delivery of the determined set of non-programming media items and the generated rules and constraints information to first client device. The delivery of the determined set of non-programming media items may be instructed to facilitate execution of an action in response to a user selection of at least one user option (hereinafter, "user options) presented at the first client device or the second client device. Such action is executed based on the generated rules and constraints information.

In accordance with an embodiment, the media stream corresponds to one of an uncompressed linear media stream, an encoded linear media stream, a video on demand (VOD) media stream, a live media stream, and a combination of a linear, a live, or a VOD media stream. The plurality of identifiers may indicate a plurality of insertion points in the programming media content. Such plurality of identifiers corresponds to a defined standard or non-defined standards. The set of non-programming media items include at least graphical content, textual content, video content, animated content, or other digital content presentable on the first client device.

In accordance with an embodiment, the media stream is a pre-encoded video-on-demand (VOD) asset, and the circuitry is further configured to package the generated media stream in a specified format for the delivery to the first client device. The specified format corresponds to at least one of a hypertext transport protocol (HTTP) Live Streaming (HLS) format, Microsoft smooth streaming, Dynamic Adaptive Streaming over HTTP (DASH), Protected HTTP Dynamic Streaming (PHDS), Protected HTTP Live Streaming (PHLS), real time messaging protocol (RTMP), and a digital streaming protocol.

The user parameters may include at least a user-preference, a user profile, a user identifier (ID), a device ID, a historic behavioral pattern, a user location, a time zone, demographic details, and a user intent to engage with a non-programming media item. The targeting parameters may include at least a cost per thousand impressions (CPM) for a non-programming media item, and a cost per sale (CPS) for the non-programming media item. The goals may be at least one of a revenue-based goal, an impressions-based goal, and a sales-based goal.

The first client device may be content recognition-enabled device. The content recognition of the media stream at the first client device may be utilized to identify at least one of an event opportunity identifying marker or a time code associated with one or more of the set of non-programming media items to display the user options. The user options are selected after a defined time duration to defer one or more of the set of non-programming media items to the second client device. The presentation of the media stream at the first client device is resumed after deferral of one or more of the set of non-programming media items to the second client device.

The user option may correspond to one of an option to a purchase of a product promoted by a non-programming media item, a reverse bid on the product, a social sharing, and a deferral of the product to the second client device. The circuitry may be further configured to enable a trigger element that corresponds to one or more of the set of non-programming media items. The enabled trigger element may be configured to receive a trigger input from the user to avail one or more services associated with one or more of the set of non-programming media items. In accordance with an embodiment, the trigger element may correspond to a man-machine interface such as a hardware button located on a dedicated trigger device or a communication device associated with the first client device. In accordance with another embodiment, the trigger element corresponds to at least one of a user interface (UI) control presented on the first client device or the second client device, a voice input, a gesture input, a touch input, a man-machine interface or an input via an interface that in configured to receive a trigger input from a user to avail one or more services associated with one or more of the set of non-programming media items. In some embodiments, the circuitry may be configured to transmit a notification to a first UI on the first client device. The notification may indicate that the deferred non-programming media item(s) are available for a display on a second UI of the second client device. Also, the circuitry may be further configured to determine a priority of one or more of the set of non-programming media items deferred to the second client device.

The circuitry may be further configured to periodically update the generated rules and constraints information for one or more non-programming media items of the set of non-programming media items, based on a modification in the user parameters. A modified version of one or more non-programming media items of the set of non-programming media items may be further generated based on updated user parameters. The modified version is transmitted for a presentation on the first client device prior to the presentation of the programming media content on the first client device. In some cases, the generated modified version corresponds to a pre-roll of one or more of the set of non-programming media items.

In another aspect, various embodiments of the disclosure provide a first client device that may include at least one circuit (hereinafter, "circuitry" that handles client-end rules-based presentation of non-programming media items present with the programming media content. The circuitry may be configured to detect a plurality of identifiers present within or associated with the programming media content with presentation of the programming media content at the first client device. The programming media content may be present in a media stream received from a media presentation and distribution system, in response to a user request from the first client device. The programming media content in the media stream is at least one of a compressed linear media content, an encoded linear media content, a video on demand (VOD) media asset, a live media content, and a combination of a linear, a live, or a VOD media content, and wherein the at least one circuit is further configured to package the generated media stream in a specified format for the delivery to the first client device. The circuitry may be further configured to transmit a request that includes the user parameters to the media presentation and distribution system. The request may be transmitted based on the detection of the plurality of identifiers during the presentation of the programming media content at the first client device. The circuitry may be further configured to receive a set of non-programming media items and rules and constraints Information for one or more of the set of non-programming media items, based on the transmitted request to the media presentation and distribution system. The circuitry may be further configured to insert the received set of non-programming media items in the programming media content based on the received rules and constraints information. The circuitry may be further configured to present user options for one or more of the received set of non-programming media items on an interface (e.g., a display, a man-machine interface, or a speaker) of the first client device or the second client device. The user options may be presented, based on the received rules and constraints information for one or more non-programming media items of the received set of non-programming media items. Thereafter, the circuitry may be further configured to execute an action in response to a user selection of the presented at least one user option at the first client device or the second client device. The action is executed for one or more non-programming media items of the set of non-programming media items to provide a seamless view of the programming media content at the first client device and increase a likelihood of a user engagement with the one or more of the set of non-programming media items.

In accordance with an embodiment, the circuitry may be further configured to transmit a user request for delivery of the programming media content at the first client device. The user request may include the user parameters. The media stream may be further received in response to the user request. The media stream may include the programming media content with the plurality of identifiers present in (or associated with) the programming media content. The plurality of identifiers in the media stream corresponds to a plurality of metadata triggers.

In accordance with an embodiment, the executed action, for example, is a deferral of one or more of the set of non-programming media items to the second client device, a direct purchase of a product presented with a non-programming media item, or a skipping of one or more of the set of non-programming media items with presentation of the programming media content at the first client device.

FIG. 1 is a block diagram that illustrates exemplary system for handling rules-based delivery and presentation of non-programming media items at a first client device or a second client device paired with the first client device, in accordance with an exemplary embodiment of the disclosure. With reference to FIG. 1, there is shown a network environment 100 that may include a media presentation and distribution system 102. The media presentation and distribution system 102 may further include a scheduling and packaging system 104, which may be communicatively coupled to a plurality of content generation systems 106A . . . 106N and a plurality of content and data sources 108A . . . 108N, via a first network 110A. There is also shown at least a first client device 112 communicatively coupled to the media presentation and distribution system 102, via the first network 110A. A second client device 114 may be communicatively coupled to the first client device 112, via a second network 110B. Although only the first network 110A and the second network 110B are mentioned in FIG. 1, however, the first client device 112 and the second client device 114 may be coupled to the media presentation and distribution system 102, via different other networks.

In some embodiments, a communication device 116 may be communicatively coupled to the first client device 112 and/or the second client device 114, via the second network 110B. There is further shown a user 118 associated with the first client device 112, the second client device 114, and the communication device 116, such as a trigger device capable of receiving a trigger input from the user 118.

The media presentation and distribution system 102 may include one or more content delivery networks (CDNs) (not shown) that may be utilized to provide media streams as packetized files to the first network 110A for distribution to the first client device 112. In such a case, various servers and systems, such as the plurality of content generation systems 106A . . . 106N and the plurality of content and data sources 108A . . . 108N may form a CDN (for example, a cloud-based CDN). It may be noted that different CDNs may communicate with the first client device 112, via different types of communication platforms, without deviation from the scope of the disclosure.

The plurality of content generation systems 106A . . . 106N may comprise suitable logic, circuitry, and interfaces that may be configured to place orders of at least one non-programming media item, such as advertisements (video or graphic ads), promotional content, demos, or ad-creative, by the media presentation and distribution system 102, via the first network 110A. Hereinafter, "at least one non-programming media item" may be referred to as "one or more non-programming media items". Such orders may include airing constraints and placement requirements for non-programming media items that may correspond to a plurality of candidate spots in the programming media content. The airing constraints that correspond to each of the plurality of candidate spots may include, but are not limited to, network constraints, selling title constraints, inventory utilization type constraints, allowable date and time constraints, and advertiser conflict constraints.

The plurality of content and data sources 108A . . . 108N may comprise suitable logic, circuitry, and interfaces that may be configured to communicate with the media presentation and distribution system 102, via the first network 110A. Examples of the plurality of content and data sources 108A . . . 108N may include, but are not limited to a distribution source device, an audience data source, or a social media server. In accordance with an embodiment, the distribution source device may provide the programming media content, such as a video feed and a schedule of a channel to the media presentation and distribution system 102. The audience data source may provide audience data, such as user demographics data, user estimation data, audience targeting data, device type data, device platform data, and content recognition-based data, such as automatic content recognition (ACR)-based data, which may correspond to subscribers of the plurality of client devices. The social media server may provide social media data, such as trending data and user profile data, and user activities/footprints data to the media presentation and distribution system 102.

The first network 110A may be a single network, or a combination of various networks for a long-range wired/wireless communication that may occur between various systems and devices, such as the media presentation and distribution system 102, the plurality of content generation systems 106A . . . 106N, the plurality of content and data sources 108A . . . 108N, and a plurality of first client devices (including the first client device 112). For example, the first network 110A may include one or more of a cable television network, the Internet, a satellite communication network, a wide area network (WAN), a medium area network (MAN), a local area network (LAN), an analog terrestrial network, a digital terrestrial network, a direct-to-home satellite network, cable, an Internet Protocol (IP), and an over-the-top television (OTT) network.

The second network 110B may be a communication network that may facilitate a short-range wired/wireless communication between various devices. The second network 110B may be local network between devices, such as the first client device 112, the second client device 114, and the communication device 116 associated with the user 118. For example, the second network 110B may include one or more of Bluetooth, Infrared, Near-field Communication (NFC), Ultra band, Zigbee, Wifi-based Adhoc network, and the like.

The first client device 112 may comprise suitable logic, circuitry, interfaces, and/or code that may be configured to receive the programming media content, the non-programming media items, and/or the graphics and the associated content, as a media stream, via the first network 110A. Examples of the first client device 112 may include, but are not limited to, conventional televisions devices, smart television devices, laptops, digital media players (for example, network-based video streaming devices).

The second client device 114 may comprise suitable logic, circuitry, interfaces, and/or code that may be configured to receive a part of the media stream, such as the non-programming media items, deferred by the scheduling and packaging system 104 of the media presentation and distribution system 102, via the first network 110A. Another part of the media stream, such as the programming media content, received at the first client device 112, via the first network 110A, may be viewed at the first client device 112 by the user 118 and the non-programming media items may be deferred to the second client device 114, via the second network 110B. Examples of the second client device 114 may include, but are not limited to, connected televisions and second screen devices, such as smartphones and tablets.

The communication device 116 may comprise suitable logic, circuitry, interfaces and/or code that may be configured to receive a trigger input and communicate to the first client device 112 or the second client device 114, to avail one or more services (for example, direct purchase, registration, social sharing, or product subscription) associated with one or more non-programming media items. In accordance with an embodiment, the one or more non-programming media items may be the deferred non-programming media item (by the scheduling and packaging system 104 in the media presentation and distribution system 102) displayed on the second client device 114. In accordance with an embodiment, the one or more non-programming media items, as a part of the received media stream, may be displayed directly on the first client device 112. In accordance with an embodiment, communication device 116 may include a man-machine interface such as a hardware button configured to receive a trigger input from the user 118.

For the sake of brevity, there are shown only two client devices (for example, the first client device 112 and the second client device 114), and one communication device 116, and one associated user, such as the user 118, in FIG. 1. However, there may be more than two client devices (e.g. thousands of client devices), communication devices ice), and associated users in the network environment 100, without any deviation from the scope of the disclosure.

In operation, a user request may be communicated to the scheduling and packaging system 104 of the media presentation and distribution system 102, via the first network 110A. The user request may include user-preferences, or user-attributes (for example, demographic details associated with a user). The media presentation and distribution system 102 may be configured to receive the user request. In response to the user request, the media presentation and distribution system 102 may be configured to prepare a programming schedule, prepare the programming media content, and package the programming media content based on the programming schedule. Thus, the media presentation and distribution system 102 may initially determine what type of programs match the user-preferences in the provided user request. In cases where the type of media programs may be part of a live, linear, or a non-linear programming, the media presentation and distribution system 102 may decide whether to prepare a live media feed, a linear media feed, a VOD media feed for delivery to the first client device 112.

The media presentation and distribution system 102 may be further configured to further generate a programming schedule based on decisions taken against the user-preferences and available inventories for delivery of the programming media content to the first client device 112. The generated programming schedule may include details of what programs are to be played at what time and for what duration at the first client device (e.g. the first client device 112). The generated programming schedule may further include time slots for different candidate durations for presentation (or playback) of non-programming media items (e.g. advertisements, promotional graphics or videos, banners, $\frac{1}{3}^{rd}$ graphics, and the like). The time slots may be presentation durations allocated specifically for the non-programming media items between different segments of the programming media content. Alternatively, the time slots may be allocated as certain defined durations for overlay of non-programming media items over the programming media content.

The media presentation and distribution system 102 may be further configured to prepare a media feed based on the generated programming schedule. The media feed may include the programming media content embedded with a plurality of identifiers associated with the programming media content. Alternatively, the plurality of identifiers may be metadata triggers that may be tags that are provided with a client manifest generated along with the media feed. Examples of the plurality of identifiers may include, but are not limited to, an audio beacon (audible or inaudible to the user), an image beacon, a data beacon, a Nielsen ID3 tag, Society of Cable Telecommunications Engineers-35 (SCTE-35) message, and SCTE-104 messages.

In a specific implementation, the media feed prepared based on the generated programming schedule may be present in an uncompressed and unencrypted serial digital interface (SDI or HD-SDI) format. In another implementation, the media feed may be present in an encrypted and compressed format. The plurality of identifiers in the media feed may correspond to various insertion points for the one or more non-programming media items in the programming media content of the media feed. The plurality of identifiers may be defined as per a defined SCTE standard. An example of the plurality of identifiers may include SCTE-104 triggers or SCTE-35 triggers.

The media presentation and distribution system 102 may be configured to further generate a media stream that is an encoded stream of the programming media content with the plurality of identifiers (embedded, tagged or specified with client manifest), based on the generated media feed, as per a compressed media format. The plurality of trigger messages may be associated with encoded programming media content and encoded one or more non-programming media items in the generated media stream.

The media presentation and distribution system 102 may be further configured to package/transcode the generated media stream for distribution to the first client device 112 in accordance with requirements of desired media streaming communications protocol, via the first network 110A. Also, the generated media stream may be fragmented and transcoded for adaptive bitrate streaming (ABS) on different client devices that have variable network bandwidth. The specified communication protocol may correspond to at least one of a hypertext transport protocol (HTTP) Live Streaming (HLS), Microsoft smooth streaming, Dynamic Adaptive Streaming over HTTP (DASH/MPEG-DASH), Protected HTTP Dynamic Streaming (PHDS), Protected HTTP Live Streaming (PHLS), or Real Time Messaging Protocol (RTMP), and/or other digital media streaming protocols. Thereafter, the generated media stream (fragmented or non-fragmented) may be delivered by the media presentation and distribution system 102 at the first client device 112, via the first network 110A. The delivered media stream may include the programming media content and the plurality of identifiers present with the programming media content.

The first client device 112 may receive the media stream that includes the programming media content with the plurality of identifiers embedded (or linked) to the different time slots in the programming media content. The first client device 112 may have digital players (media playback engines) that may be configured to execute presentation of the programming media content and further detect the plurality of identifiers with the presentation of the programming media content. Alternatively, the plurality of identifiers may be detected well before the presentation of the programming media content at the first client device 112. In accordance with an embodiment, instead of detection of the plurality of identifiers at the first client device 112, an intermediary server (not shown) may be configured to detect the plurality of identifiers with the presentation of the programming media content at the first client device 112 106. The intermediary server may share operational load of the first client device 112 and the media presentation and distribution system 102 by optimally performing operations of the first client device 112 and the media presentation and distribution system 102.

In response to the detection of one or more of the plurality of identifiers, the first client device 112 (or the intermediary server) may be configured to transmit a request to the media presentation and distribution system 102 for delivery of trigger-related non-programming media items. The request may be further transmitted for delivery of rules and constraints information to the first client device 112 (or an intermediary server). Such requests may include airing constraints and placement requirements of non-programming media items that may correspond to a plurality of candidate spots in the programming media content. The airing constraints that may correspond to each of the plurality of candidate spots may include, for example, one or more network constraints, selling title constraints, inventory utilization type constraints, allowable date and time constraints, and advertiser conflict constraints. The media presentation and distribution system 102 may be configured to collect various information from the plurality of content and data sources 108A . . . 108N. The plurality of content and data sources 108A . . . 108N may correspond to various systems, such as, but not limited to, a distribution source device, an audience data source, and a social media server, to provide data to the media presentation and distribution system 102. Thereafter, the media presentation and distribution system 102 may be configured to determine a set of non-programming media items (for example, audio ads, video ads, overlay graphics, such as $\frac{1}{3}^{rd}$ graphics, banners, bugs, logos, etc.) for delivery to the first client device 112, in response to the request from the first client device 112 (or the intermediary server that requests on behalf of the first client device 112).

The media presentation and distribution system 102 may be further configured to define (i.e. generate) rules and constraints information (i.e. a placement attribute, a behavior attribute, a presentation attribute, an interactivity attribute, and other attributes) that determines the presentation the determined set of non-programming media items. The presentation of the set of non-programming media items may be determined to be in accordance with the placement attribute, the behavior attribute, the presentation attribute, the interactivity attribute, and other configurable attributes in the defined rules and constraints information. The set of non-programming media items and the defined rules and constraints information may be delivered to the first client device 112 (or the intermediary server). The media presentation and distribution system 102 may be further configured to instruct delivery of the determined set of non-programming media items and the generated rules and constraints information to first client device 112. The delivery of the determined set of non-programming media items may be instructed to facilitate execution of an action in response to a user selection of the user options presented at the first client device 112 or the second client device 114.

In some embodiments, the first client device 112 may be configured to insert the set of non-programming media items in the programming media content that is currently streamed and played at the first client device 112, based on the rules and constraints information. In other embodiments, instead of the first client device 112, the intermediary server may be configured to insert the set of non-programming media items in the programming media content that is currently streamed and played at the first client device 112. The intermediary server may further communicate the media content that includes the programming media content inserted with the set of non-programming media items to the first client device 112.

The first client device 112 may be configured to execute operations associated with presentation of the programming media content along with the set of non-programming media items at the first client device 112. During such presentation, the first client device 112 may be configured to present user-options, which may be overlaid on the programming media content at a display of the first client device 112. The user-options may include, but are not limited to, options to purchase of products/services promoted in a non-programming media item, options to defer presentation of the non-programming media item to the second client device 114 that is paired with the first client device 112, and options to skip presentation of non-programming media items, or share information associated with a watched non-programming media item on a social platform.

The first client device 112 may be further configured to execute an action based on the defined rules and constraints information. Such actions may include execution of tasks provided in the user-options, for example, deferral of non-programming media items to the second client device 114. In some embodiments, a pre-roll notification before the start of the programming media content or a post-roll notification after the end of the programming media content, may be presented on the first client device 112. The pre-roll notification may be a pre-roll advertisement or a promotional media message that plays before the programming media content the user has selected. The post-roll notification may be an advertisement that plays at the end of programming media content that has been selected by user for viewing.

After a user input is received for selection of the pre-roll notification or the post-roll notification, the first client device 112 may acquire (or collate) the set of non-programming media items and present a collated non-programming media at the first client device 112 prior to the presentation or post the presentation of the programming media content. Alternatively stated, a user has to watch a collated set of non-programming media items once and the programming media content may be watched without any interruption caused by the presentation of the non-programming media items. The first client device 112 may further display a notification, received from the media presentation and distribution system 102, via the first network 110A, when the non-programming media items are deferred to the paired second client device 114.

The second client device 114, for example, a smart-phone, may be configured to receive one or more non-programming media items of the set of non-programming media items (for example, promotional content) deferred by the first client device 112, via the first network 110A. The deferral of the one or more non-programming media items to the second client device 114 may facilitate a seamless engagement of the user 118 with the programming media content presented at the first client device 112.

The communication device 116 may be associated with the first client device 112 and the second client device 114. The communication device 116 may correspond to, for example, a hardware button or other man-machine interface located on a communication device 116 associated with the first client device 112. Optionally, the communication device 116 may be a graphical user interface (UI) button displayed on a first UI of the first client device 112 or a second UI of the second client device 114. The communication device 116 may be configured to receive a trigger input from the user 118 to avail services associated with the non-programming media items. One or more services associated with the non-programming media item may be availed by the user 118 through the communication device 116. For example, a service associated with a one-click push button that enables purchase of a product as seen with the presentation of a non-programming media item on the first client device 112 or a deferred presentation of the non-programming media item on the second client device 114. Delivery of such services may result in an increased likelihood of user engagement with the non-programming media items on presented on the first client device 112 or presented after deferral on the second client device 114.

Figure 2:
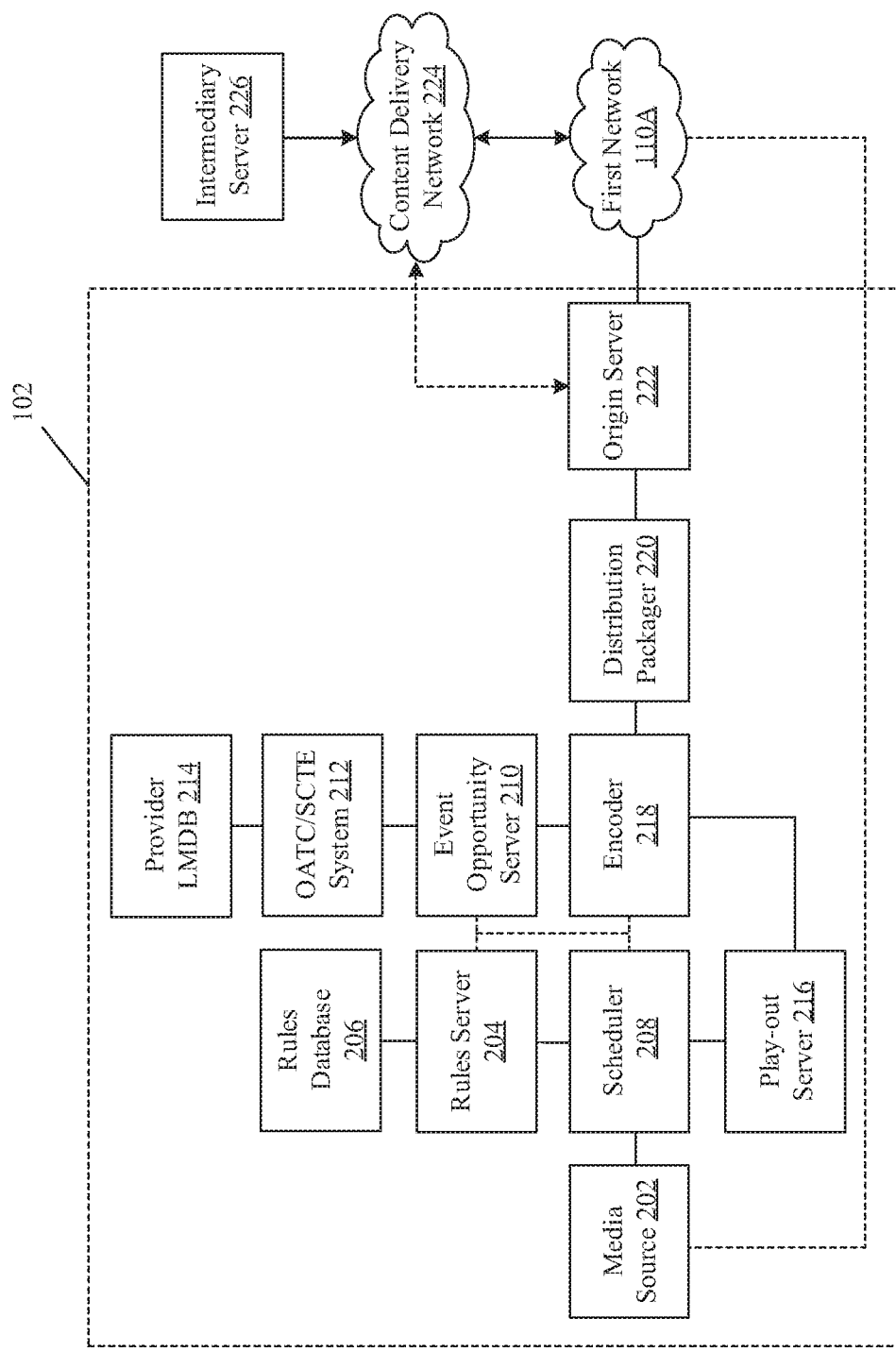
FIG. 2 is a block diagram that illustrates an exemplary media presentation and distribution system for controlled presentation of non-programming media items at different client devices, in accordance with an embodiment of the disclosure.

FIG. 2 is a block diagram that illustrates an exemplary media presentation and distribution system for controlled presentation of non-programming media items at different client devices, in accordance with an embodiment of the disclosure. FIG. 2 has been described in conjunction with elements from FIG. 1. With reference to FIG. 2, there is shown the media presentation and distribution system 102 that may include the scheduling and packaging system 104. The scheduling and packaging system 104 may further include a media source 202, a rules server 204, a rules database 206, a scheduler 208, an event opportunity server (EOS) 210, an Open Authentication Technology Committee/Society of Cable Telecommunications Engineers (OATC/SCTE) system 212, a provider Live Metadata Database (LMDB) 214, a play-out server 216, an encoder 218, a distribution packager 220, an origin server 222. Additionally, an intermediary server 226 may be communicatively coupled to the media presentation and distribution system 102, via a content delivery network 224 that may be further communicatively coupled to different components of the media presentation and distribution system 102.

The media source 202 may comprise suitable logic, circuitry, and interfaces that may be configured to provide programming media content, such as TV shows and movies. In accordance with an embodiment, the media source 202 may be a part of the media presentation and distribution system 102, in which case, the media presentation and distribution system 102 may correspond to a content provider. In accordance with another embodiment, the media source 202 may be a separate entity associated with another third-party content provider. In such a case, the media presentation and distribution system 102 may correspond to a service provider.

The rules server 204 may comprise suitable logic, circuitry, interfaces, and/or code that may be configured to define rules and constraints information for the one or more non-programming media items. The rules server 204 may be further configured to manage storage and retrieval of the rules and constraints information from the rules database 206. The rules server 204 may be configured to transmit the rules and constraints information to the first client device 112 or the intermediary server 226, in accordance with the decisions of the EOS server 210. The rules server 204 may be implemented as a separate processor or circuitry in the media presentation and distribution system 102. Alternatively, the rules server 204 may be implemented as a processor that is integrated with a cluster of processors that execute the functions of the rules server 204. Alternatively, the rules server 204 may be implemented as a set of instructions stored in a memory storage device of the media presentation and distribution system 102, which upon execution by a processor, may execute the functions and operations for the rules server 204.

The rules database 206 may comprise suitable logic, circuitry, and interfaces that may be configured to store the rules and constraints information that may be defined by the rules server 204. The rules database 206 may be communicatively coupled with the EOS server 210, via the rules server 204. The rules database 206 may be primarily managed and periodically updated by the rules server 204. The periodical update may correspond to an update of the one or more rules at defined time intervals, based on various factors, such as modification in the user parameters, for example, user preferences, demographic factors, targeting parameters as defined by advertisers for the user (or a specific audience), and the like.

The scheduler 208 may comprise suitable logic, circuitry, and interfaces that may be configured to generate a programming schedule in a broadcast automation system (not shown) of the media presentation and distribution system 102. The programming schedule may be generated based on the programming media content received from the media source 202. The scheduler 208 may be implemented as a separate processor or circuitry in the media presentation and distribution system 102. Alternatively, the scheduler 208 may be implemented as a processor that is integrated with a cluster of processors that execute the functions of the scheduler 208. Alternatively, the scheduler 208 may be implemented as a set of instructions stored in a memory storage device of the media presentation and distribution system 102, which upon execution by a processor, may execute the functions and operations for the scheduler 208.

The EOS server 210 may comprise suitable logic, circuitry, and interfaces that may be configured to receive SCTE information, such as the SCTE-35 trigger messages that correspond to the SCTE-104 metadata triggers, from the OATC/SCTE system 212. Thereafter, the EOS server 210 may be configured to provide the SCTE information to the play-out server 216 and the encoder 218. Accordingly, the EOS server 210 may control, in conjunction with the OATC/SCTE system 212, various operations, for example, but not limited to, insertion of the plurality of identifiers (that corresponds to the plurality of metadata triggers), tags (such as Nielson ID3 tags), and breakout codes, in the media stream generated by the encoder 218. Thereafter, based on the received SCTE information and/or over-the-top (OTT) network information and/or configuration, the EOS server 210 may be configured to provide response actions to the encoder 218 and/or the distribution packager 220. Examples of such response actions may include, but are not limited to, slate/source to insert the one or more non-programming media items and specific tags to place in the HLS playlist and DASH manifest.

The OATC/SCTE system 212 may comprise suitable logic, circuitry, and interfaces that may be configured to execute instructions that may be associated with storage and provision of OATC and/or SCTE trigger messages, such as the plurality of trigger messages, to the EOS server 210. The OATC/SCTE system 212 may be configured to provide scheduling information to the EOS server 210 based on at least in part of live metadata received from the provider LMDB 214. The OATC/SCTE system 212 may further provide various constraints related to the programming media content. For example, the live metadata in the OATC/SCTE system 212 may control archival and blocking of the programming media content, programming media content blackout restrictions, blackout slates, or content source references and media item slate references.

The provider LMDB 214 may comprise suitable logic, circuitry, and interfaces that may be configured to execute instructions associated with storage and supply of live metadata, associated with the programming media content, to the OATC/SCTE system 212. The provider LMDB 214 may be further configured to receive metadata information from the broadcast automation system. The provider LMDB 214 may be configured to store real-time information of the programming media content in the distribution chain.

The play-out server 216 may comprise suitable logic, circuitry, and interfaces that may be configured to generate a media feed that includes the programming media content and the plurality of metadata triggers (as the plurality of identifiers) in an uncompressed SDI format. The media feed may include the type of programming and/or non-programming content that may be pre-scheduled for delivery to the first client device 112, or may be delivered on demand to the first client device 112.

The encoder 218 may comprise suitable logic, circuitry, interfaces and/or code that may be configured to receive the media feed with the plurality of metadata triggers from the play-out server 216 in an uncompressed format. The plurality of metadata triggers may correspond to various insertion points associated with the programming media content. An example of the plurality of metadata triggers may correspond to SCTE-104 triggers. Further, the encoder 218 may be configured to generate a media stream, based on the received media feed, in a compressed format. The media feed may be encoded by a conversion of the plurality of metadata triggers received from the EOS server 210 into the plurality of trigger messages. The plurality of trigger messages may be associated with the encoded programming media content and the encoded non-programming media items in the generated media stream.

The distribution packager 220 may comprise suitable logic, circuitry, and interfaces that may be configured to execute instruction that may be associated with packaging of the generated media stream, received from the encoder 218, in a specified format. The packaged media stream may be distributed, via the first network 110A, to a plurality of client devices (such as the first client device 112 and/or the second client device 114) associated with a user, such as the user 118. The distribution packager 220 may be operated by a distribution source, such as the media presentation and distribution system 102. The distribution packager 220 may be further configured to process and insert broadcast time codes as received from an internal system clock or an external Network Time Protocol (NTP)-based source into the packaged programming media content for the various specified formats for the distribution to the first client device 112. The origin server 222 may comprise suitable logic, circuitry, and interfaces that may be configured to store the generated media stream, packaged by the distribution packager 220 in the various specified formats for distribution to the first client device 112. The origin server 222 may be further configured to communicate graphics and/or graphics-related overlay content to one or more systems or databases communicatively coupled with the first network 110A. The graphics and/or graphics-related overlay content may include various non-programming media items, such as animated graphics, banners, overlays, text content, audio content, and video content.

The intermediary server 226 may comprise suitable logic, circuitry, and interfaces that may be configured to execute operations associated with detection of metadata triggers (or identifiers) in the programming media content and insertion of non-programming media items in the programming media content based on defined rules and constraints information received from the rules server 204 of the media presentation and distribution system 102. The intermediary server 226 may execute operations on behalf of the first client device 112 to minimize an operational load at the first client device 112.

In operation, the user request may be communicated to the scheduling and packaging system 104 of the media presentation and distribution system 102 that may handle rules-based presentation of the one or more non-programming media items, from the media stream those users (such as the user 118) wishes to consume. Alternatively, the user request may be communicated to the intermediary server 226 that may further transmit the request to the media presentation and distribution system 102, via the first network 110A.

The media source 202 of the media presentation and distribution system 102 may be configured to provide programming media content to the scheduler 208. In accordance with an embodiment, based on an on-demand request received from the user 118, the media source 202 may be configured to retrieve a pre-encoded programming media content, such as pre-stored VOD items of a channel, from a VOD asset storage (not shown). Generally, the term "content," "media," and similar words are used interchangeably to refer to any type of media—audio, videos, data-casts, music, text, images, graphics, articles, photos, photo galleries, video galleries, info graphics, maps, polls, guest biographies, tweets or other social media, blog posts, and/or the like.

The scheduler 208 may be configured to generate a programming schedule for a media feed, based on the generated plurality of rules in a broadcast automation system (not shown) of the media presentation and distribution system 102. The programming schedule may be generated based on the programming media content received from the media source 202. The generated programming schedule may indicate a time-based parameter, and/or a region-based parameter associated with the programming media content and may have time slots allocated for a set of non-programming media items (for example, video ads, overlay ads, bugs, etc.). For example, the programming schedule may indicate a start time, an end time of the programming media content in a series of on-screen views. The time-based parameter of the programming schedule may be indicative of timestamps at which the programming media content, the one or more non-programming media items, and/or graphics are required to be presented at the on-screen view of the channel, with a distribution of the channel content. The region-based parameter of the programming schedule may be an indicative of specific regions or sections on the on-screen view of the channel where the programming media content, the one or more non-programming media items, and/or graphics are required to be presented.

The play-out server 216 may be further configured to generate a media feed that includes the programming media content and the plurality of metadata triggers (also referred to as the plurality of identifiers embedded or linked with the programming media content) in an uncompressed SDI format. The play-out server 216 may be further configured to communicate the generated media feed to the encoder 218. The media feed may correspond to an uncompressed (high-definition) serial digital interface (HDSDI) protocol feed.

The plurality of metadata triggers may correspond to embedded metadata triggers that includes frame accurate declarations of the programming media content and time slots for the one or more non-programming media items. In accordance with an embodiment, the media feed may be prepared as a linear media feed, a live, or a non-linear (for example, VOD) media feed, or a combination of different types of media feeds.

The encoder 218 may be further configured to receive the plurality of trigger messages that corresponds to different event opportunities in the programming media content, from the play-out server 216. Each trigger message may be associated with a trigger metadata and other resources for tagging of the received programming media content. The plurality of trigger messages may be communicated by the OATC/SCTE system 212 to the encoder 218. The OATC/SCTE system 212 may be configured to provide scheduling information associated with the placement of the one or more non-programming media items to the EOS server 210, based on at least in part of live metadata received from the provider LMDB 214. In accordance with an embodiment, the OATC/SCTE system 212 may be configured to maintain a repository of a plurality of metadata triggers and a plurality of trigger messages that correspond to defined SCTE standards. The plurality of metadata triggers may correspond to various insertion points associated with the programming media content and the one or more non-programming media items in the media feed. An example of the plurality of metadata triggers may correspond to SCTE-104 triggers.

The EOS server 210 may be configured to manage execution, performance, and personalization of the programming media content, and the one or more non-programming media items for the user 118. The EOS server 210 may be further configured to provide response actions to the encoder 218, the intermediary server 226, or directly to the first client device 112 based on scheduling information (SCTE information and/or over-the-top (OTT) network information and/or configuration) received from the OATC/SCTE system 212. Examples of such response actions may include, but are not limited to, slate/source to insert the one or more non-programming media items and what tags to place in the HLS playlist and DASH manifest. The scheduling information, such as the SCTE-35 trigger messages that correspond to the SCTE-104 metadata triggers, may be received by the EOS server 210 from the OATC/SCTE system 212. The SCTE-104 triggers are standardized metadata insertion specifications that may be utilized to declare digital insertion points of the programming media content and the one or more non-programming media items in high definition (HD) SDI streams. The SCTE-104 may enable the insertion of the one or more non-programming media items and other custom content, such as content-recognition-based triggers and items in the media feed.

The encoder 218 may be configured to encode the received media feed received from the play-out server 216 and generate a compressed media stream encoded with a plurality of trigger messages, i.e. with SCTE-35 messages, from the plurality of metadata triggers, i.e. SCTE-104 metadata triggers. The SCTE-35 is a standardized advertisement insertion specification that is utilized to define, for example, cue and insertion points in the encoded compressed media stream. The encoder 218 may be configured to receive the plurality of trigger messages from the EOS server 210. In accordance with an embodiment, the encoder 218 may be configured to encode the received media feed and generate the encoded compressed media stream in a specified format.

In an exemplary instance, the specified format may be the MPEG-2 transport stream (TS).

The plurality of trigger messages are associated with encoded programming media content in the generated media stream. Therefore, the plurality of trigger messages corresponds to the plurality of metadata triggers in the retrieved media feed. The encoder 218 may be operable to receive an uncompressed (high definition) serial digital interface (HDSDI) protocol feed, which may comprise embedded metadata triggers that can include frame accurate declarations of non-programming media items and media content time boundaries. The uncompressed (high definition) serial digital interface (HDSDI) protocol feed may include a linear distribution feed. In an exemplary embodiment of the disclosure, the serial digital interface (SDI/HDSDI) protocol feed may include a SCTE-104 SDI protocol feed. SCTE-104 is a standardized metadata insertion specification that may be utilized to declare digital insertion points of program and advertisement content in high definition (HD) SDI streams. SCTE-104 enables the insertion of advertisements (commercials) and custom content such as the ACR-based triggers and items in the HD SDI broadcast stream. The encoder 218 may be configured to encode the received linear feed (or nonlinear feed) and generate an encoded compressed stream with content triggers translated from the broadcast SCTE-104 messages. In an exemplary embodiment of the disclosure, the encoder 218 may be operable to encode the received feed and generate an MPEG-2 transport stream (TS) with SCTE-35 messages. SCTE-35 is a standardized advertisement insertion specification that is utilized to define, for example, cue and insertion points in MPEG-2 transport streams.

The distribution packager 220 may be configured to package the generated media stream in a specified format for distribution, via the first network 110A, to at least one client device, such as the first client device 112, associated with a user, such as the user 118. The distribution packager 220 may be operated by a distribution source, such as the media presentation and distribution system 102. The distribution packager 220 may be further configured to manage the processing and insertion of broadcast time codes as received from an internal system clock or an external Network Time Protocol (NTP)-based source into the packaged programming media content for the various specified formats for distribution.

In an embodiment of the disclosure, the distribution packager 220 may be configured to package at least a portion of the encoded compressed stream with the SCTE-35 triggers into streaming or segmented streaming protocol formats. Exemplary streaming or segmented streaming protocol formats may include, for example, hypertext transport protocol (HTTP) Live Streaming (HLS) format, Microsoft smooth streaming, Dynamic Adaptive Streaming over HTTP (DASH) (also referred to as MPEG-DASH), Protected HTTP Dynamic Streaming (PHDS), Protected HTTP Live Streaming (PHLS), and real time messaging protocol (RTMP). The distribution packager 220 may be configured to interpret the encoded triggers and incorporate manifests file for the streaming protocols. The distribution packager 220 may also be operable to handle the processing and insertion of distribution time codes as obtained from an internal system clock or external NTP (Network Time Protocol) based source into the packaged content for the various distribution stream formats. In the case of segmented streaming protocols (e.g., HLS, DASH, Microsoft Smooth Streaming, and HTTP Dynamic Streaming (HDS), the packager may use distribution time codes as part of the naming convention of the stream chunks so as to enable DVR presentation via dynamic playlist creation.

The origin server 222 may be configured to store the generated media stream, packaged by the distribution packager 220, for the various specified formats for distribution. The origin server 222 may also be configured to communicate graphics and/or graphics-related overlay content to one or more systems or databases communicatively coupled with the first network 110A. The graphics and/or graphics-related overlay content may include various non-programming media items, such as animated graphics, banners, overlays, text content, audio content, and video content. The origin server 222 and/or first delivery network may be operable to dynamically deliver content from the point in time requested, which is specified by the content recognition detection parameters. The distribution packager 220 may be further configured to deliver the packaged media stream of the programming media content to the first client device 112. Alternatively, the packaged media stream of the programming media content may be delivered to the intermediary server 226 that may further deliver the media stream to the first client device 112.

At the user-end, the first client device 112 may be utilized by the user 118 to consume the programming media content in the media stream (for example, linear broadcast content or VOD content) received from the distribution packager 220 or the intermediary server 226. The programming media content may be presented on the first client device 112, for example, an ACR-enabled smart TV that receives the media stream via the first network 110A, which could be an internet-based network. In some embodiments, the first client device 112 may be configured to detect one or more of the set of identifiers (or metadata triggers) present (or encoded/embedded) in the programming media content.

The one or more of the set of identifiers may be detected at the presentation time (or prior to the presentation time or playback time) of the programming media content at the first client device 112. Upon detection, the first client device 112 may transmit a request along with user parameters to the EOS server 210 (of the media presentation and distribution system 102) for delivery of trigger-related non-programming media items at the first client device 112. The request may be further associated with a delivery of rules and constraints information (for example, rules to present deferral options, rules to decide when, where and how to present a non-programming media item with the programming media content, etc.) at the first client device 112. The user parameters may include, but limited to, a user-preference, a user profile, a user identifier (ID), a device ID, a historic behavioral pattern, a user location, a time zone, demographic details, and a user intent associated with a type of non-programming media item.

In some embodiments, instead of the first client device 112, the one or more of the set of identifiers may be detected by the intermediary server 226 on behalf of the first client device 112, during the presentation (or prior to the presentation or playback) of the programming media content at the first client device 112. Similarly, instead of the first client device 112, the intermediary server 226 may request the EOS server 210 for delivery of non-programming media items at the first client device 112 along with the rules and constraints information.

In response to the request, the EOS server 210 may be configured to determine a set of non-programming media items that could be presented with the programming media content at different time slots (or regions in a frame) specified by the plurality of identifiers (or metadata triggers). The set of non-programming media items may be determined based on the user parameters received with the request, campaign goal parameters specified by an advertiser (or promotor), cost per thousand impressions, cost per sales for a non-programming media item, or other targeting parameters associated with different non-programming media items. The set of non-programming media items may be retrieved from advertisement content library of an advertiser network, such as the content generation system 106A, via the first network 110A. The advertisement content library may store a repository of non-programming media items and associated media item metadata, such as closed captions data. Each non-programming media item may be associated with at least one of a media content source (such as an advertiser or promoter), media item information (such as creative information), a plurality of users (such as a target audience), and a required duration of presentation the non-programming media item at the first client device 112.

The rules server 204 may be configured to receive information associated with the determined set of non-programming media items, such as advertisement content, promotional content, a demo, or an ad creative. The rules server 204 may be configured to define rules and constraints information that may be utilized to select a behavior, a presentation, a presentation, an interactivity, and placement, and/or other attributes for the set of non-programming media items. The rules and constraints information may be defined based on user parameters, other targeting parameters (specified by advertisement networks, content providers, or other networks), and the like. The user parameters may include, but not limited, at least a user-preference, a user profile, a user identifier (ID), a device ID, a historical behavior pattern, a user location, a time zone, demographic details, and a user intent associated with a non-programming media item. The rules server 204 may be further configured to manage the storage/retrieval of the rules and constraints information and may further manage delivery of the rules and constraints information to the EOS server 210. The EOS server 210 may be further configured to deliver the determined set of non-programming media items along with the received rules and constraints information to the first client device 112. The EOS server 210 may instruct the delivery of the determined set of non-programming media items and the generated rules and constraints information to first client device 112 (or the intermediary server 226). The delivery of the determined set of non-programming media items may be instructed to facilitate execution of an action in response to a user selection of user options that may be presented at the first client device 112 or the second client device 114.

The first client device 112 may be configured to receive the set of non-programming media items along with the rules and constraints information from the EOS server 210. The first client device 112 may be configured to insert the set of non-programming media items at the time slots defined by the detected set of identifiers (or metadata triggers or tags) in the programming media content. The insertion of the set of non-programming media items may be done based on the received rules and constraints information with the set of non-programming media items. For example, a non-programming media item may be inserted based on a defined rule. The defined rule may specify a presentation of an option to purchase a promoted product or defer the non-programming media item to the second client device 114. The deferral option may be presented in case the user 118 may be hesitant (or uninterested or indifferent) to watch and/or engage with a non-programming media item during the presentation of the programming media content at the first client device 112.

In some embodiments, instead of the first client device 112, the determined set of non-programming media items along with the received rules and constraints information may be delivered to the intermediary server 226, via the first network 110A. Similarly, instead of the first client device 112, the intermediary server 226 may be configured to insert the set of non-programming media items at the time slots defined by the detected set of identifiers (or metadata triggers or tags) in the programming media content. The insertion of the set of non-programming media items may be done based on the received rules and constraints information with the set of non-programming media items. Thereafter, the intermediary server 226 may be configured to deliver the programming media content inserted with the set of non-programming media items to the first client device 112.

The first client device 112 may be configured to present the non-programming media items with the presentation of the programming media content at defined time slots and/or regions in frames of the programming media content. Prior to the presentation or during the presentation of the programming media content, the first client device 112 may be configured to present user-options (for example, deferral option, skip option, purchase option, bidding options, and the like) onto a display of the first client device 112. The user-options may be presented for different non-programming media items inserted in the programming media content. The decision regarding whether to present the user-option or not with the presentation of an associated with non-programming media item may be communicated in the received rules and constraints information. As an example, in a case where the user-option to defer the non-programming media item may be communicated only when a set sales or impression target for the associated non-programming media item has been achieved. As another example, a user-option to purchase a product offering promoted by the non-programming media item may be communicated only when the product offering is deliverable at the user location, from local, hyper local stores, or from a remote warehouse, with due consideration of inventory constraints.

In a case where the user option presented onto the display of the first client device 112 is selected, the first client device 112 may be configured to execute an action based on the rules, constraints, and other parameters for one or more of the set of non-programming media items that is based on the received rules and constraints information. Otherwise, the first client device 112 may dismiss the presented user-option and continue with the presentation of the non-programming media items with the programming media content, without further presentation of a user-option on the display of the first client device 112 for associated non-programming media item.

The user parameters may be further updated by the first client device 112 when an action is executed and the updated user parameters and current display state (for example, display state based on deferral, non-deferral, purchase, etc.) are transmitted and delivered to the media presentation and distribution system 102, via the first network 110A. For example, after a specific advertisement is deferred to the second client device 114 repeatedly in a certain time period, the user preferences may be updated and associated with advertisement or product/service offerings promoted by the advertisement may be added under dislikes for the user. The update of the one or more user parameters may further provide a precise information and control to the media presentation and distribution system 102 for defining the rules and constraints information for non-programming media items that may be delivered in future on the first client device 112. The update may include modifications of parameters that may further facilitate in specifying on a per program basis whether the non-programming media items are allowed by a provider for a specific action (for example, deferral) to the second client device 114, or whether pre-roll, post-roll non-programming content, or other non-programming content types may be presented with the programming media content instead of the inserted non-programming media items. In certain implementations, deferred non-programming media items may be available on the second client device 114 after a specific time from the presentation of the programming media content at the first client device 112. For example, the programming media content may be communicated for consumption on various end-user devices (for example, the first client device 112) and non-programming media items from the received media stream may be communicated for consumption at the second client device 114.

In certain implementations, when one or more of the inserted set of non-programming media items are selected for deferral to the second client device 114, a presentation of pre-roll non-programming content, post-roll non-programming content, or other non-programming content types may be selected for the first client device 112. The selection of pre-roll, post-roll or other non-programming content types may be done based on different rules and constraints, which may be global in nature or may be specific to the requirements of the user 118, a type of non-programming media item (graphic assets, video assets, audio assets, etc.), or content/ad network.

The rules and constraints information may include a set of rules, which may include, but are not limited to a first rule based on which the first client device 112 may be enabled to receive a user input to skip the presentation of a non-programming media item at the first client device 112 and a second rule based on which a non-programming media item may be presented for a minimum viewing time after which a user-option is enabled for skipping the presentation. The set of rules may also include, but are not limited to a third rule based on which a non-programming media item may be presented at the first client device 112 for a cumulative presentation duration till a certain point in a duration of the programming media content and a fifth rule based on which a number of non-programming media items may be specified for presentation in a commercial POD. The set of rules may also include, but are not limited to a sixth rule based on which the first client device 112 may be enabled to receive a user input to skip the commercial POD and a seventh rule based on which the first client device 112 may be enabled to receive a user input to select a duration of presentation of a non-programming media item and a seventh rule based on which the first client device 112 may be enabled to receive a user input to watch a specific number of non-programming media items and collect ad free points in response to watching the specific number of non-programming media items.

The rules and constraints information may further include a set of constraints. The set of constraints may include, but are not limited to a first constraint based on which the user-option to skip a non-programming media item may be limited by a specific number of skips and a second constraint based on which the user-option to skip a non-programming media item may be only presented again till a preferred non-programming media item is played at the first client device 112. The set of constraints may also include, but are not limited to a third constraint based on which a minimum viewing time for a non-programming media item may be selected based on the at least one goal or the at least one targeting parameter and a fourth constraint based on which a non-programming media item may be presented in accordance with an ad inventory, a number of insertion orders, or a length of program in a duration of the programming media content.

Different scenarios for other non-programming content types that are played under different rules and/or constraints has been described hereinafter. The rules and constraints may be defined (or specified) by the media presentation and distribution system 102 and acted upon by the first client device 112 (or the intermediary server 226).

In a first case, a user-option to skip an advertisement (non-programming media content) may be presented on the display of the first client device 112, during (or prior) to the presentation of the programming media content/non-programming media items at the first client device 112. The user-option may be presented based on a certain rule that allows a user to select the presented user-option to skip the presentation of the advertisement. However, a constraint may be further applied to limit a number of times the user-option to skip the advertisement can be selected by the user 118. The user-option may only be presented again till a preferred advertisement is played (and watched) by the user 118 at the first client device 112. Alternatively stated, the user 118 can skip ads until they see the one, they want to watch. However, the user 118 is limited to being able to skip only a certain number of times.

In a first variation in the rules and constraints for such first case, a minimum viewing time may be provided for a presented non-programming media item before the user-option to skip the advertisement is presented (or activated) at the first client device 112. The minimum viewing time or a set amount of viewing time may be applied by the advertisement/content provider networks or based on requirements specified in goals (CPM, CPS, etc.) for the advertisement. For example, a variable/customizable amount of time may be defined so that the user 118 may spend certain minimum time, e.g., zero or one second of viewing before skip or a specified "X" seconds.

In a second variation, a cap on a number of skip options may be applied before a complete advertisement may be viewed (or played) at the first client device 112. As an example, if a "15 seconds" advertisement is skipped and a "60 seconds" advertisement is viewed, the first client device 112 may identify a total viewing time for advertisements equivalent for "4 advertisements" of "15 seconds" duration.

In a third variation, a configurable constraint may be applied that may specify the viewer (or user) to watch the advertisements of a cumulative presentation duration (for example, "5 minutes") till a certain point in the presentation duration of the requested programming media content at the first client device 112. Such configurable constraint may be applied to ensure that a goal (e.g., revenue-based goal, impression-based goal, sales-based goal, etc.) is fulfilled within the due presentation duration of the programming media content at the first client device 112. As an example, for a commercial of "X durations per quartile", a configurable constraint may be applied knowing that behaviors of a program are learned, and rules may be modified with the constraints to ensure that revenue targets of the content provider meets/exceeds the projected revenue target. The application of reconfigurable constraint may further create a requirement to determine a collection of advertisements that may be played back to back after a commercial break (also referred to as a commercial POD) and a number of ads in a single POD. In certain scenarios, if the expected total revenue per asset (VOD asset) is known and the CPMs of specific ad assets are also known, then skip parameters to meet or exceed revenue targets without negatively impacting a viewer, such as the user 118, may be optimized. This scenario may improve addressable advertising, which may increase CPMs, which in turn increases efficiency and revenue with lighter ads loads with built in contingency for viewer abandonment.

In a second case, the user-option to skip an advertisement may be presented on the display of the first client device 112. A rule may be further applied that may be used to limit a number of skip options within a POD with respect to a duration of an ad break. For example, is there a requirement to push 4 ad breaks that totals for "1 minute" or "1 ad break" of "4 minutes?" The rule may be determined by analyzing behavior patterns of the viewer (a user of the first client device 112), the advertiser, ad inventory, insertion orders/media buy outs, length of show (or program), and the like. The rule may further factor conditions associated with a value of non-programming media items in terms of CPM or a duration of non-programming media items in the system set-up based on specified weight parameters. In some embodiments, the disclosed system (e.g., the by the media presentation and distribution system 102) may learn and dynamically adjust based on individual viewer habits and overall asset (VOD asset) consumption (or TV series or movie) habits.

In a third case, a user-option to skip a POD(s) may be presented prior to the presentation of the advertisements in the POD(s) if an entire POD has been previously watched by the user. Such user-option may be further associated with an option to watch pre-roll upfront of all advertisements with the presentation of the programming media content and later no advertisements may be served in the viewing duration of the programming media content. For example, a user-option may include a message that says, "Do you want to watch all the ads up front and enjoy the rest of your program without commercial interruption?" In case the upfront option is not selected, options to skip an ad POD (or a commercial break) or an individual ad may be further presented onto the display of the first client device 112.

In a fourth case, prior to presentation of a program (part of the programming media content), a user-option may be presented to select a length of advertisement at certain points in the programming media content. For example, a user-option may include a message that says, "Would you be interested in watching a lengthier (promo/ad) in exchange with a shorted ad?" In case the lengthier ad is watched, the subsequent ad load (frequency and length of ads) would be decreased at the first client device 112.

In an implementation other than the aforementioned cases, a state of a current advertisement POD may be determined to know what should be served next (also referred to as informing ad sequencing). The determination of such state may be done by the media presentation and distribution system 102 and such determination may facilitate a viewer to progress through a flight of advertisements and engage with a story presented in the flight of advertisements. For example, an advertiser may prefer that a viewer (user of the first client device 112) watches the first commercial in a flight "X times" before seeing the second commercial to gain a maximum messaging penetration (or conversion rate for the promoted product/service/ad). The advertisers/content providers may provide a rule, which specifies that an advertisement needs to be viewed "X" times before the viewer can see the next advertisement. The rule may further specify that unless the viewer interacts with an advertisement, the same advertisement may be presented "X" times after which the next advertisements in the flight plan is presented in accordance with a brand campaign sequence. Also, the rule may specify that if a viewer interacts with an advertisement, the interacted advertisement should be allocated a higher value for both viewer and advertiser, and thus may have a higher CPM and a potential to reduce ad load for the viewer.

In another implementation, a reward-based rule may be generated that may allow a viewer to elect to watch the same number of advertisements and earn ad free points for future ad free viewing options. For example, a viewer may earn ad free points while watching "a cartoon show" on "Monday" and may utilize the ad free points to watch ad free movies on "Thursday". The ad free points may be redeemable or used across same media network or different media networks in the form of a virtual currency. Additionally, a quick splash screen with a view of a product may be presented at the first client device 112 after an ad is played along with an option to acknowledge the product displayed in the quick splash screen. In a case where an acknowledgement of the displayed product is received, a confirmation note may be generated that may indicate that the viewer paid attention to the product displayed in quick splash screen. Also, more rewards points may be credited to the user account to avail ad free viewing options in future.

In yet another implementation, a value of user interactivity with an advertisement may be determined by the media presentation and distribution system 102. Such value may be utilized to define how much user interaction is worth "X number of ads" reduced from an ad load at the first client device 112. For example, the value of an interaction type may be determined allowing a different value to be assigned to an interaction (such as worth x number of ads reduced from an ad load). It may be determined, for example, that interactions where a viewer shares data with an advertiser or completes a purchase will be designated as having a higher value" therefore reducing the ad loads by a higher number of ads or allowing a viewer to earn a higher number of rewards points. As an example, if an action associated with a purchase of a product(s) (with or without trigger buttons) is executed at the first client device 112, a message or a notification may be served at the first client device 112 that may say, "the rest of the program will be presented commercial free" and thanking the viewer for placing an order and optionally a thank you message allowing the viewer to select between viewing the remainder of the program commercial free or receiving additional reward points for future use.

In certain implementation, a viewer may provide preferences for different genres of ads that the viewer may watch along with the programming media content, at the first client device 112. The weight parameters for the ad load may be adjusted based on the communicated preferences. The number of ads, PODs, and skipping rules may still remain independent or may be adjusted as viewer selected genres may imply higher CPMs. Additionally, scenarios for ad-related interactivity may be possible at the second client device 114. In a first scenario, ad interactions at the first client device 112 may be transferred (or extended) to the paired second client device 114 to facilitate interaction of a user with the advertiser and opportunities for the advertiser to extend interaction with the user. The interactions, associated rules, and rewards may be managed by the media presentation and distribution system 102.

The EOS server 210 may be further configured to transmit a notification to the first client device 112 or the second client device 114 paired with the first client device 112, via the second network 110B. The notification may indicate that the deferred one or more non-programming media items are available for display at the second client device 114 (mobile phone). One or more non-programming media items may include at least a graphical content, a textual content, a video content, and an animated content. The deferral of the one or more non-programming media items to the second client device 114 may provide a seamless view of the programming media content at the first client device 112. A prioritized view of a plurality of deferred non-programming media items may be experienced by the user 118 at the second client device 114.

The EOS server 210 may be further configured to determine a priority of one or more of the set of non-programming media items deferred to the second client device 114. The priority may be determined based on the updated user parameters and other targeting parameters (for example, cost per thousand impressions, cost per sales for the one or more non-programming media items, and the like). The updated user parameters may include at least a user-preference, a user profile, a user identifier (ID), a device ID, a historic behavioral pattern, a user location, a time zone, demographic details, and a user intent associated with the one or more non-programming media items.

In accordance with an embodiment, the first client device 112 and the second client device 114 may be associated with a trigger element that may be utilized to request one or more services associated with a non-programming media item. The one or more services may be associated with an executed action for a deferred non-programming media item or a non-deferred non-programming media item. The user 118 may avail the one or more services associated with a non-programming media item, for example, purchase a product as seen in the non-programming media item by using the trigger element, bid for a product advertised by the non-programming media item, share/chat about a product advertised by the non-programming media item, and the like. The trigger element may be, for example, a hardware button or other man-machine interface located on a dedicated trigger device or a communication device 116 associated with the first client device 112. Optionally, the trigger element may be a graphical user interface (UI) button displayed on a first UI of the first client device 112 or a second UI of the second client device 114. The deferral of the non-programming media items and further provisions to avail different services (based on the executed actions) associated with the non-programming media item may result in an increased likelihood of an engagement of the user associated with the first client device 112 and the second client device 114. The detailed scenarios for different executed actions and use cases for different rules and constraints information defined for the non-programming media items (or type of non-programming media items) has been further described in detail, for example, in FIG. 3A and FIG. 3B.

Figure 3A:
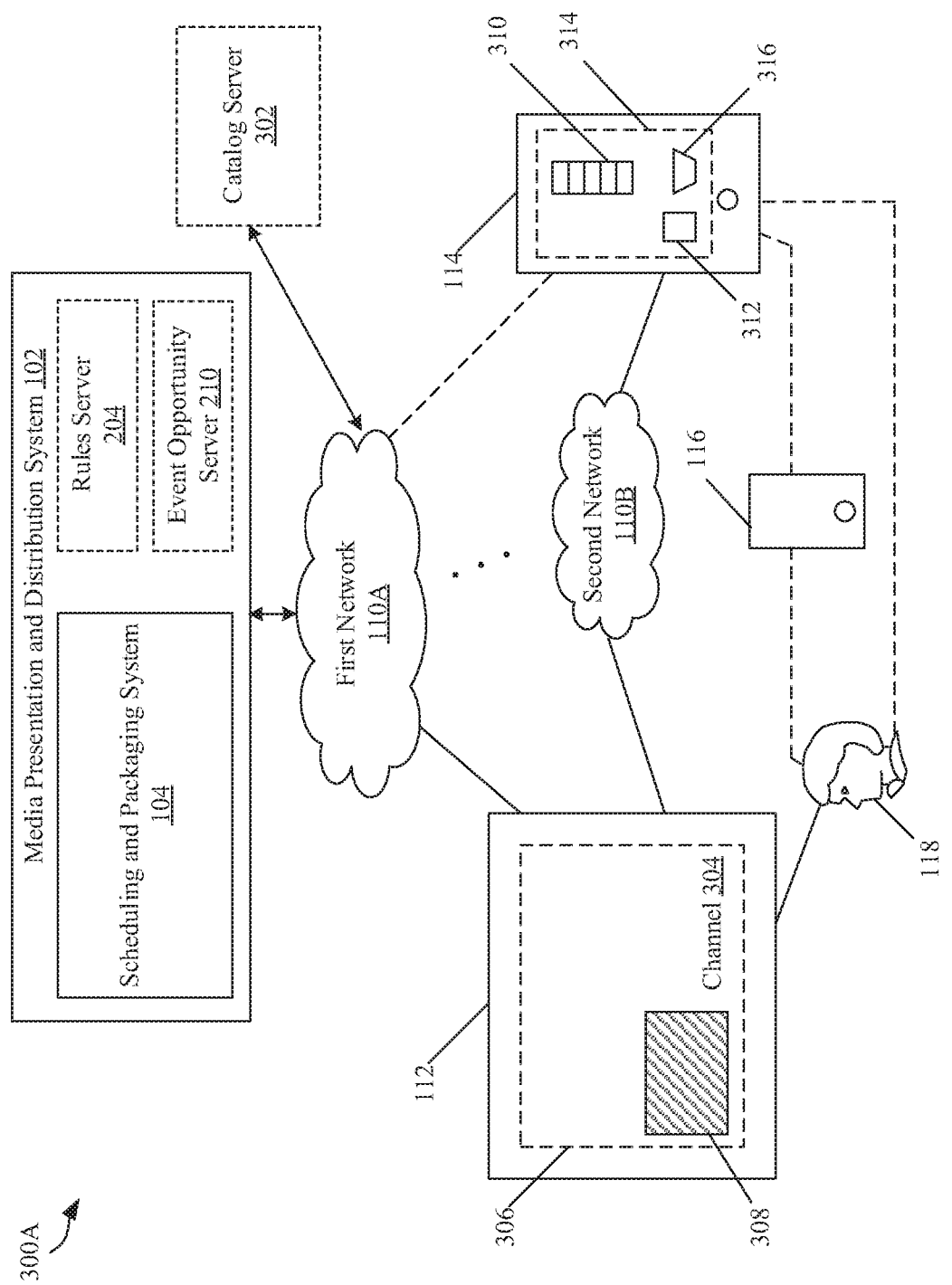
FIG. 3A illustrates exemplary scenarios for rules-based presentation of non-programming media items at different client devices, in accordance with an exemplary embodiment of the disclosure.

FIG. 3A illustrates exemplary scenarios for rules-based presentation of non-programming media items at different client devices, in accordance with an exemplary embodiment of the disclosure. FIG. 3A is explained in conjunction with elements of FIG. 1 and FIG. 2. With reference to FIG. 3A, there is shown a scenario 300A for rules-based presentation of non-programming media items. The scenario 300A may include a network of the media presentation and distribution system 102, the first client device 112, and the second client device 114, and a communication device 116. The media presentation and distribution system 102 includes the scheduling and packaging system 104, the rules server 204, and the EOS server 210. There is also shown the first network 110A and the second network 110B that provides a network communication platform for the first client device 112, the second client device 114, and the media presentation and distribution system 102. Additionally, a catalog server 302 may be present in the scenario 300A that may be configured to store a catalog of media items (programming or non-programming) for distribution to different components of the media presentation and distribution system 102. The first network 110A may crosstalk or communicate with the second network 110B.

In accordance with the scenario 300A, the first client device 112 may be set for a TV programming channel, such as a channel 304 that provides programming media content viewable at a first user Interface (UI) 306. The first UI 306 at the first client device 112 may display notifications 308 for an executed action. Similarly, the second client device 114 may be configured to display a playlist of ads 310 and a notification 312 at a second UI 314 on the second client device 114. The user 118 may be engaged with a program presented by the channel 304, for example "Turner Network Television" (TNT). The program may be delivered as per a schedule for a delivery of the programming media content, which may be a part of the packaged media stream of programming media content and the one or more non-programming media items, on the first client device 112.

The program may be consumed by the user 118 on a content-recognition (CR) enabled TV device. The program may be part of a linear programming or a non-linear programming, for example, a VOD2Live stream, Live2VOD stream, a Live2Live Stream, and the like. During a commercial break in the program, a notification by the content-recognition (CR) engine may be presented on the first UI 306 of the first client device 112. The notification may be intended to facilitate selection of an option from a given list of options in response to a user input. In one case, the notification may include an option at the first UI 306 that requires a user input. The user input may be required to select whether the program should be watched with non-programming media items or not. The notification may further include another option at the first UI 306 that requires another user input. Such user input may be required to select whether the non-programming media items that are scheduled for presentation with the program should be acted upon to deliver a service in response to the user input, for example, a deferral to the second client device 114. Such an option may be selected when the user 118 intends to watch the program ad-free or to consume the programming media content in a seamless uninterrupted manner.

In an exemplary case, the second client device 114 may be a mobile device, which may be configured to receive the deferred non-programming media items and user selections for different services through specialized trigger elements (for example, on-click service buttons). The non-programming media items (ads) may be targeted on the second client device 114 associated with the user 118 in accordance with user preferences. For example, the playlist of ads 310 that may include "Gerber" ads may be presented at the second UI 314 on the second client device 114 as per the user's preference. The "Gerber" ads may be present at the second client device 114 such that the user may engaged with the "Gerber" ads after watching the program on the first client device 112.

The notification 312 to bookmark the playlist of ads 310 may be provided on the second UI 314. For example, while watching "Gerber" ads on the second client device 114, the user 118 may be interested to buy baby food products as shown in the "Gerber" ads. The baby food products may be added to a shopping cart 316 displayed at the second client device 114, in response to a user selection. Further, a communication device 116 (or a trigger device) may be communicatively coupled to the first client device 112 and/or the second client device 114, via the second network 110B. The communication device 116 (or a trigger device) may be configured to receive a trigger user input to avail one or more services associated with one or more non-programming media items. The communication device 116 may include a man-machine interface such as a hardware button that may be further configured to provide the received trigger user input to the first client device 112 or the second client device 114. The products shown in consumable ads may be directly purchased by an order that is registered with the receipt of the trigger user input from the communication device.

The media presentation and distribution system 102 may instruct delivery of the programming media content and the non-programming media content such that a seamless and uninterrupted user experience is delivered. The viewer-centric provision at the first client device 112 to adaptively execute different actions (for example, to defer or to not defer non-programming media items to the second client device 114) associated with non-programming media items (for example, video or graphic ads) may cause an improvement in a number of viewers, a churn rate, ad sales, revenue, and ad monetization for the content provider, an advertisement provider, or other affiliates. As an example, the option to defer or to not defer a non-programming media item on another client device may be presented as a user-selectable option. The deferred ads may be made interactive on the second client device 114. As long as the ads are viewed by the user, the user-selectable option is provided to facilitate rescheduling/deferral of ads on preferred user devices in accordance with preferred timings for the user 118.

Figure 3B:
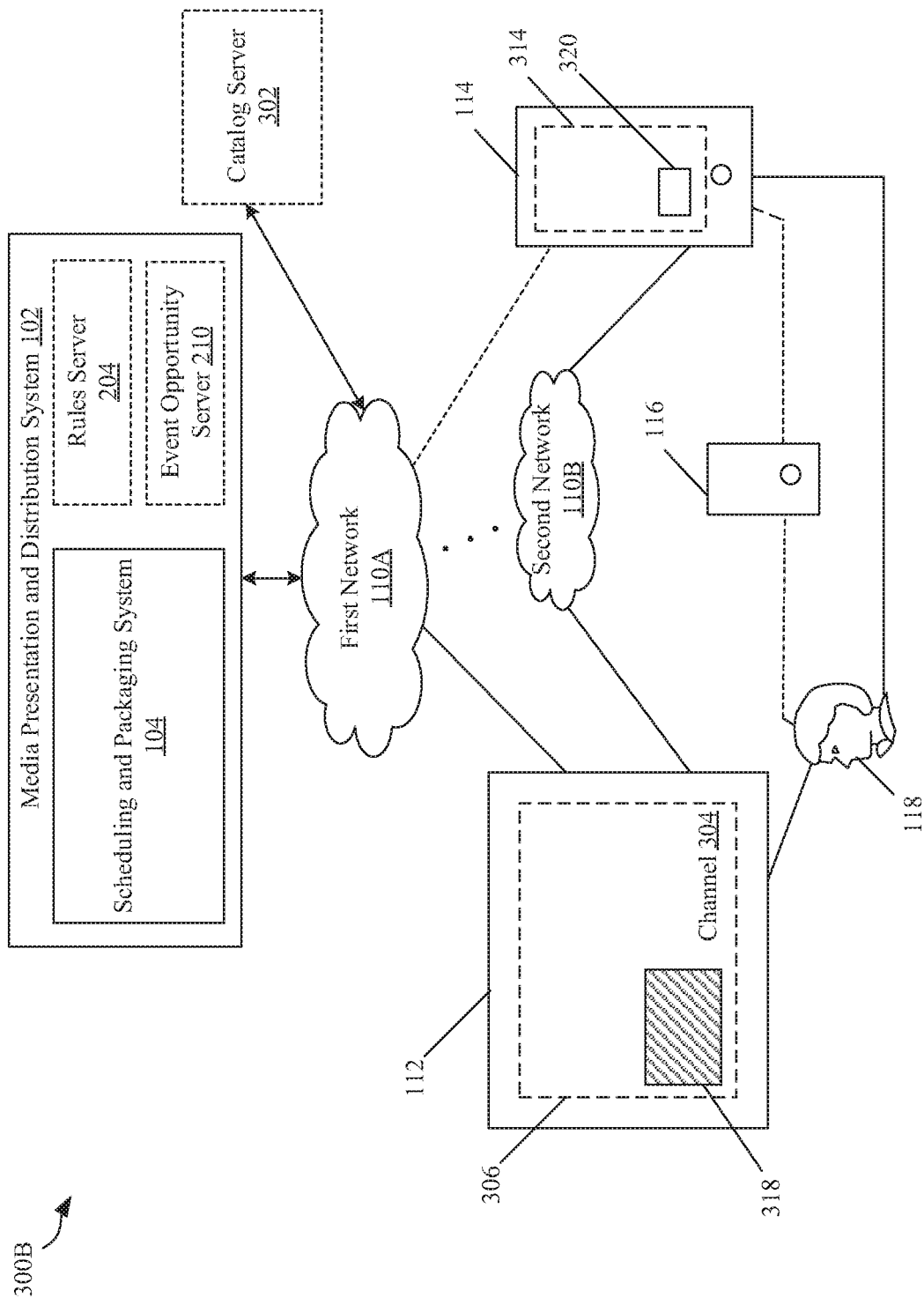
FIG. 3B illustrates an exemplary scenario for rules-based deferral of non-programming media items presented with programming media content, in accordance with an exemplary embodiment of the disclosure.

FIG. 3B illustrates an exemplary scenario for rules-based deferral of non-programming media items presented with programming media content, in accordance with an exemplary embodiment of the disclosure. FIG. 3B is explained in conjunction with elements of FIG. 1, FIG. 2, and FIG. 3A. With reference to FIG. 3B, there is shown a scenario 300B for a rules-based presentation of non-programming media items. The scenario 300B may include a network of the media presentation and distribution system 102, the first client device 112, and the second client device 114, and the communication device 116. The media presentation and distribution system 102 includes the scheduling and packaging system 104, the rules server 204, and the EOS server 210. There is also shown the first network 110A and the second network 110B that provides a network communication platform for the first client device 112, the second client device 114, and the media presentation and distribution system 102. Additionally, the catalog server 302 may be present in the scenario 300B that may be configured to store a catalog of media items (programming or non-programming) for distribution to different components of the media presentation and distribution system 102.

The first client device 112 may execute operations associated with the presentation of the programming media content at the first client device 112. A pre-roll notification 318 may be served at the first UI 306 of the first client device 112 prior to presentation of the programming media content. The pre-roll notification 318 may be served based on at least one of a user-selection of a deferral option on the first client device 112 or a pre-specified user preference (stored in the rules database 206). The pre-roll notification 318 may include an option for a user-based selection to watch a pre-roll non-programming media item, which may be a non-programming media item that will be played for a fixed duration prior to the presentation of the programming media content at the first client device 112, for example, a compiled ad of two minutes duration. The user-based selection of the option to watch the pre-roll non-programming media item may necessitate a user engagement with the pre-roll non-programming media item. Thereafter, the user engagement may be started or resumed for the programming media content without a presentation of other non-programming media items.

In some embodiments, the pre-roll non-programming media item may be associated with a specific arrangement of non-programming content from different non-programming media items. For example, "10" seconds duration of different non-programming media items may be combined together in a seamless manner. The pre-roll non-programming media item may be transmitted for presentation on the first UI 306 on the first client device 112. The first client device 112 may further receive a notification on the first client device 112 associated with successful engagement with the pre-roll non-programming media item prior to the presentation of the programming media content at the first client device 112.

In some embodiments, an interactive application may be launched at the second client device 114. The interactive application may be launched via the second UI 314. On launch, an interactive application interface may be displayed and may include a notification 320 associated with a promotional opportunity for the engaged pre-roll non-programming media item at the first client device 112. The notification 320 may include user options to save the product or associated with pre-roll non-programming media item, add a bookmark, or view demo videos, signup, register, or subscribe to service(s) promoted with the pre-roll non-programming media item. In other embodiments, the interactive application interface may be launched at the first client device 112 (during the presentation or at the end of presentation of the programming media content) if the interactive application interface is not accessible on the second client device 114. The second client device 114 may be enabled with provisions to receive trigger user inputs via external hardware circuitries (for example, one click buy buttons) or GUI buttons on the second UI 314.

In some embodiments, based on a specified rule, the deferred presentation of the non-programming media item may be paused/stopped/terminated when the second client device 114 is moved away or not present in a defined communication range of the communication device 116. In some embodiments instead of a short pre-roll non-programming media item, a user option for presentation of a long extended non-programming media item or a post-roll non-programming media item may be notified at the first client device 112 after which the programming media content may be played at the first client device 112 without presentation of the non-programming media items. Alternatively, a one-time fee may be paid by the user to watch the programming media content without non-programming media items.

Figure 4A:
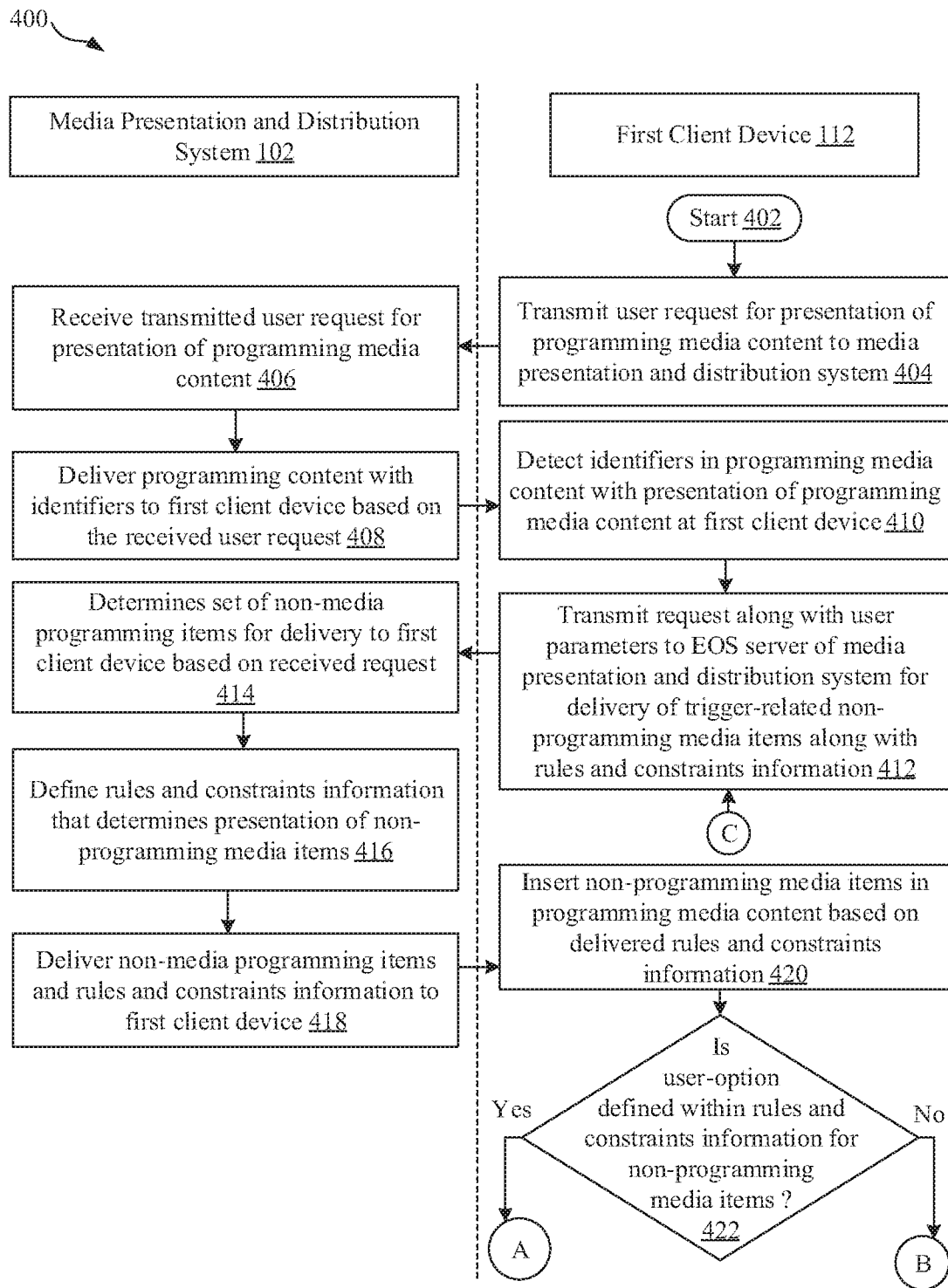
FIGS. 4A and 4B depict a flowchart that collectively illustrates exemplary operations for client-side rules-based insertion of non-programming media items in programming media content and presentation of inserted non-programming media items at a client device, in accordance with an exemplary embodiment of the disclosure.
Figure 4B:
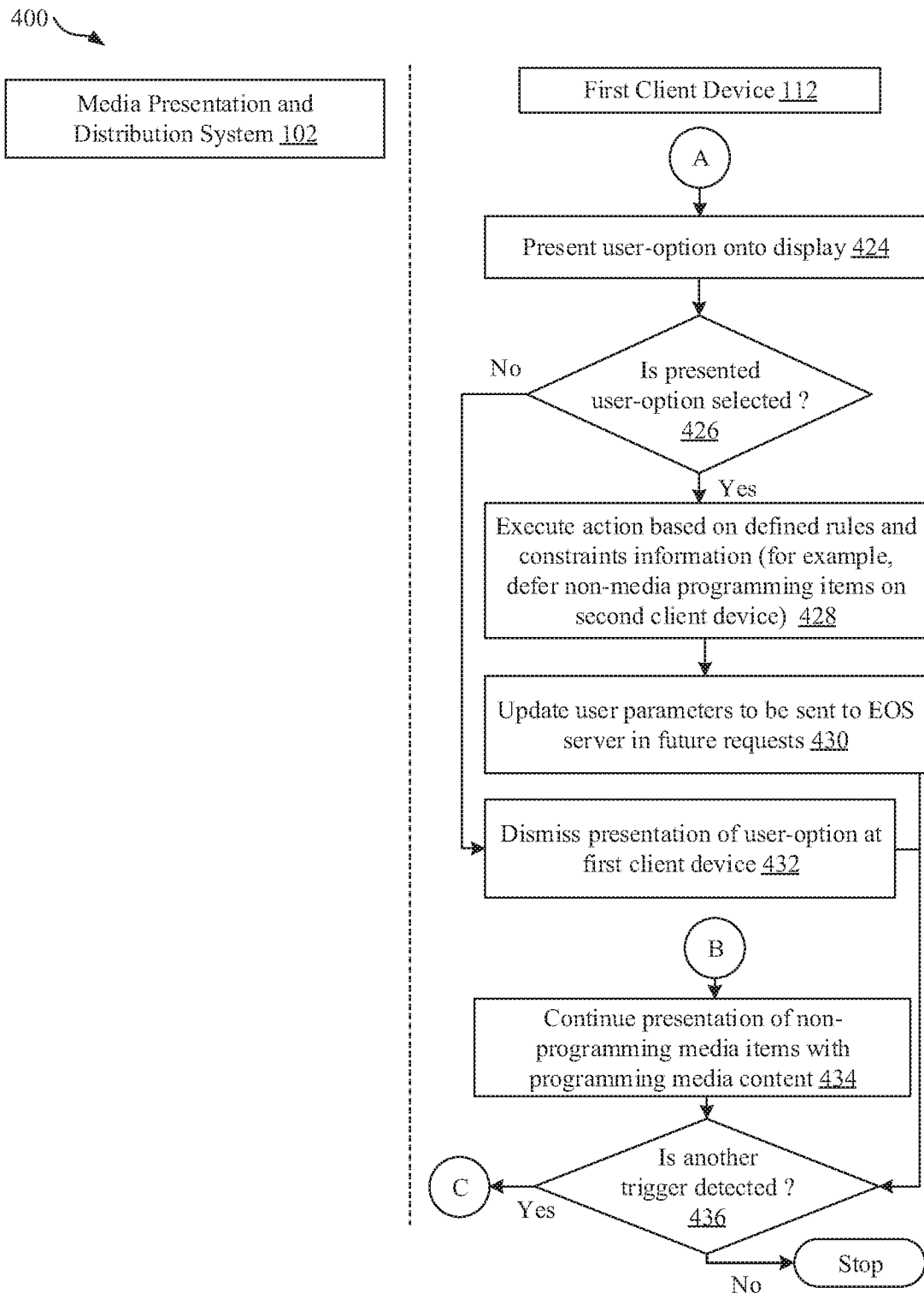

FIGS. 4A and 4B depict a flowchart that collectively illustrates exemplary operations for client-side rules-based insertion of non-programming media items in programming media content and presentation of inserted non-programming media items at a client device, in accordance with an exemplary embodiment of the disclosure. FIGS. 4A and 4B are explained in conjunction with FIGS. 1, 2, 3A, and 3B. With reference to FIGS. 4A and 4B, there is shown a flowchart 400 that includes exemplary operations from 402 through 436. The exemplary operations may start at 402 and proceed to 404.

At 404, a user request for presentation of programming media content may be transmitted to the media presentation and distribution system 102. The first client device 112 may be configured to transmit the user request for the presentation of programming media content to the media presentation and distribution system 102.

At 406, the user request for the presentation of programming media content may be received. The media presentation and distribution system 102 may be configured to receive the user request for the presentation of the programming media content.

At 408, programming media content along with identifiers may be delivered to the first client device 112, based on the received user request. In some embodiments, the identifiers may be embedded in the programming media content. In some embodiments, the identifiers may not be embedded in the programming media content, and may be communicated as a separate information associated with the programming media content. The media presentation and distribution system 102 may be configured to deliver the programming media content with the embedded identifiers to the first client device 112.

At 410, embedded identifiers in the programming media content may be detected with the presentation of the programming media content at the first client device 112. The first client device 112 may be configured to detect the embedded identifiers in the programming media content with the presentation of the programming media content at the first client device 112.

At 412, a request may be transmitted along with user parameters to EOS server 210 of the media presentation and distribution system 102 for delivery of trigger-related non-programming media items along with rules and constraints information. The first client device 112 may be configured to transmit a request along with user parameters to EOS server 210 of the media presentation and distribution system 102 for delivery of trigger-related non-programming media items along with rules and constraints information. The user parameters may include, but not limited to, a user-preference, a user profile, a user identifier (ID), a device ID, a historic behavioral pattern, a user location, a time zone, demographic details, and a user intent associated with the one or more non-programming media items. Additionally, other targeting parameters may be transmitted along with the user request, which may include, but not limited to, cost per thousand impressions and cost per sales for a non-programming media item.

At 414, a set of non-programming media items may be determined for delivery to the first client device 112 based on the received request. The EOS server 210 at the media presentation and distribution system 102 may be configured to determine a set of non-programming media items (for example, video ads, overlay graphics, etc.) for delivery to the first client device 112 based on the received request.

At 416, rules and constraint information may be defined that determines the presentation of the non-programming media items for the user 118. The rules server 204 may be configured to define the rules and constrain information that determines the presentation (e.g., behavior, interactivity, placement, presentation, and other attributes) for the non-programming media items.

At 418, the determined set of non-programming media items and the rules and constraint information may be delivered at the first client device 112. The media presentation and distribution system 102 may be configured to deliver the determined set of non-programming media items and the rules and constraint information at the first client device 112.

At 420, the determined set of non-programming media items may be inserted in the programming media content based on delivered rules and constraints information. The first client device 112 may be configured to insert the determined set of non-programming media items (for example, video ads, overlay graphics, such as bugs, banners, etc.) in the programming media content based on the delivered rules and constraints information.

At 422, it may be determined whether a user-option is defined within the delivered rules and constraints information for one or more of the set of non-programming media items. The first client device 112 102 may be configured to determine whether the user-option (for e.g., defer an ad, watch a pre-roll up front ad, purchase a product/service promoted in the ad, etc.) is defined within the delivered rules and constraints information for one or more of the set of non-programming media items. In a case where the user-option is defined, control may pass to 424. Otherwise, the control may pass to 434.

At 424, a user-option is presented onto the display of the first client device 112. The first client device 112 may be configured to present the user-option onto the display of the first client device 112, during (or prior) to the presentation time of the programming media content or the non-programming media items at the first client device 112.

At 426, it may be further determined whether the presented user-option is selected. The first client device 112 may be configured to determine whether the presented user-option is selected by a user (for example, the user 118). In a case where the presented user-option is selected, control passes to 428. Otherwise, control passes to 432.

At 428, an action may be executed based on the defined rules and constraints information (for example, defer one or more of the set of non-programming media items to the second client device 114 112). The first client device 112 may be configured to execute an action based on the defined rules and constraint information (as further explained in FIGS. 2, 3A, and 3B.

At 430, the user parameters to be sent to the EOS server 210 in future requests may be updated. The first client device 112 may be configured to update the user parameters to be sent to the EOS server 210 in future requests.

At 434, the presentation of one or more of the set of non-programming media items with the programming media content may be continued. The first client device 112 may be configured to continue with the presentation of one or more of the set of non-programming media items with the programming media content.

At 436, it may be determined whether another embedded identifier is detected. The first client device 112 may be configured to determine whether another embedded identifier is detected with the presentation of the programming media content. In a case where another embedded identifier is detected, control passes to 412. Otherwise control passes to end.

Figure 5A:
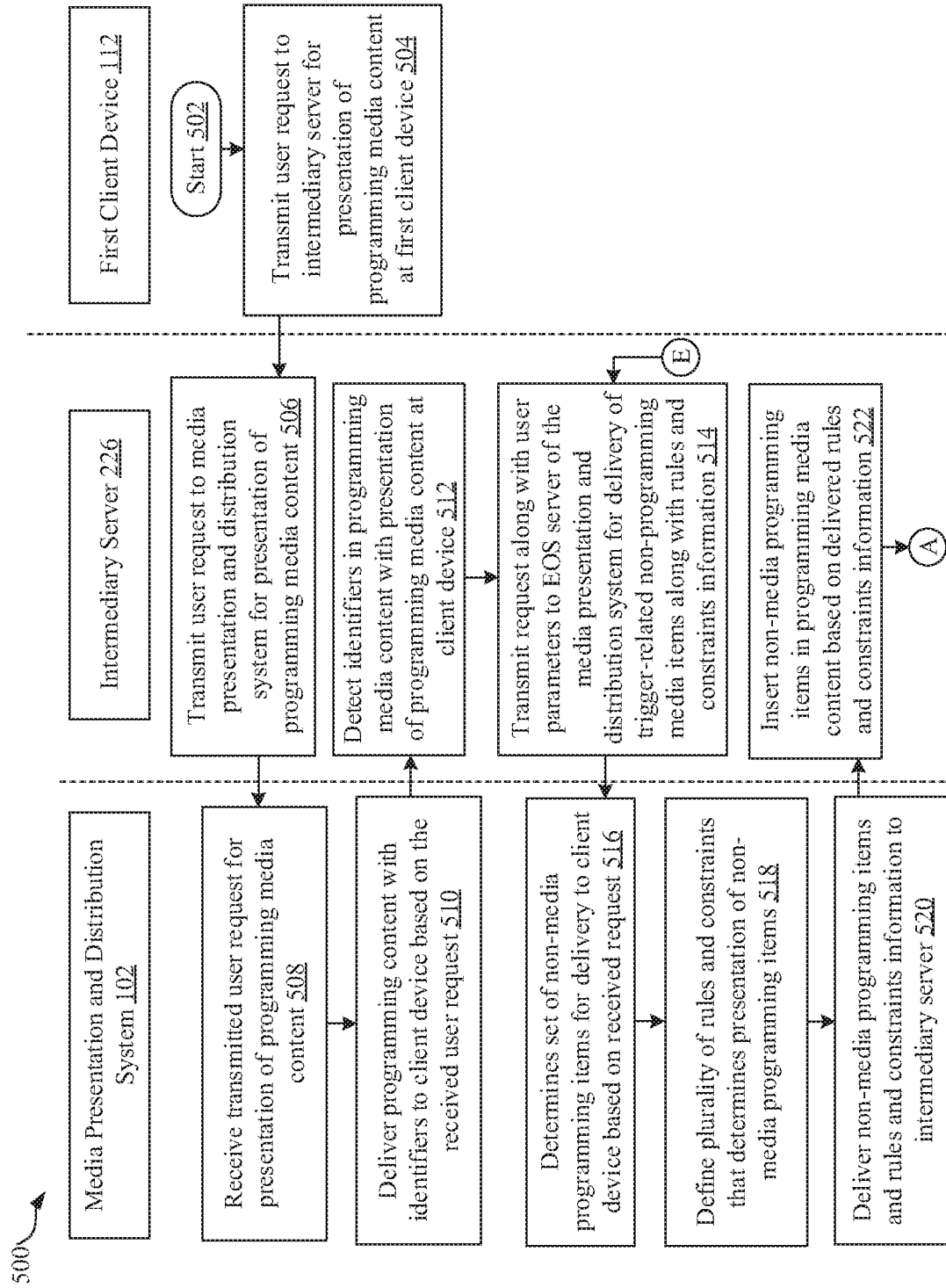
FIGS. 5A, 5B, and 5C depict a flowchart that collectively illustrates exemplary operations for server-side rules-based insertion of non-programming media items in programming media content and presentation of inserted non-programming media items at different client devices, in accordance with an exemplary embodiment of the disclosure.
Figure 5B:
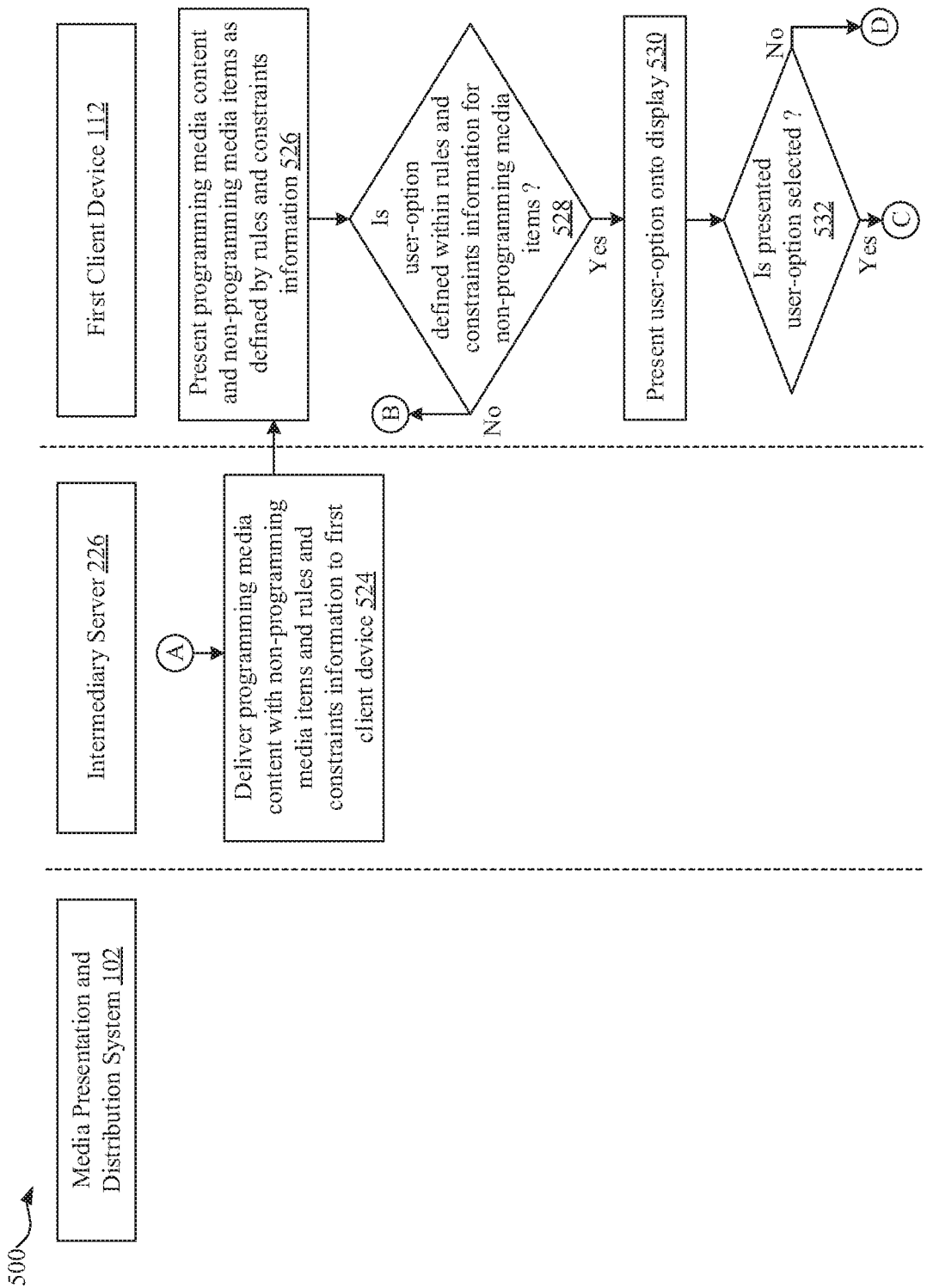
Figure 5C:
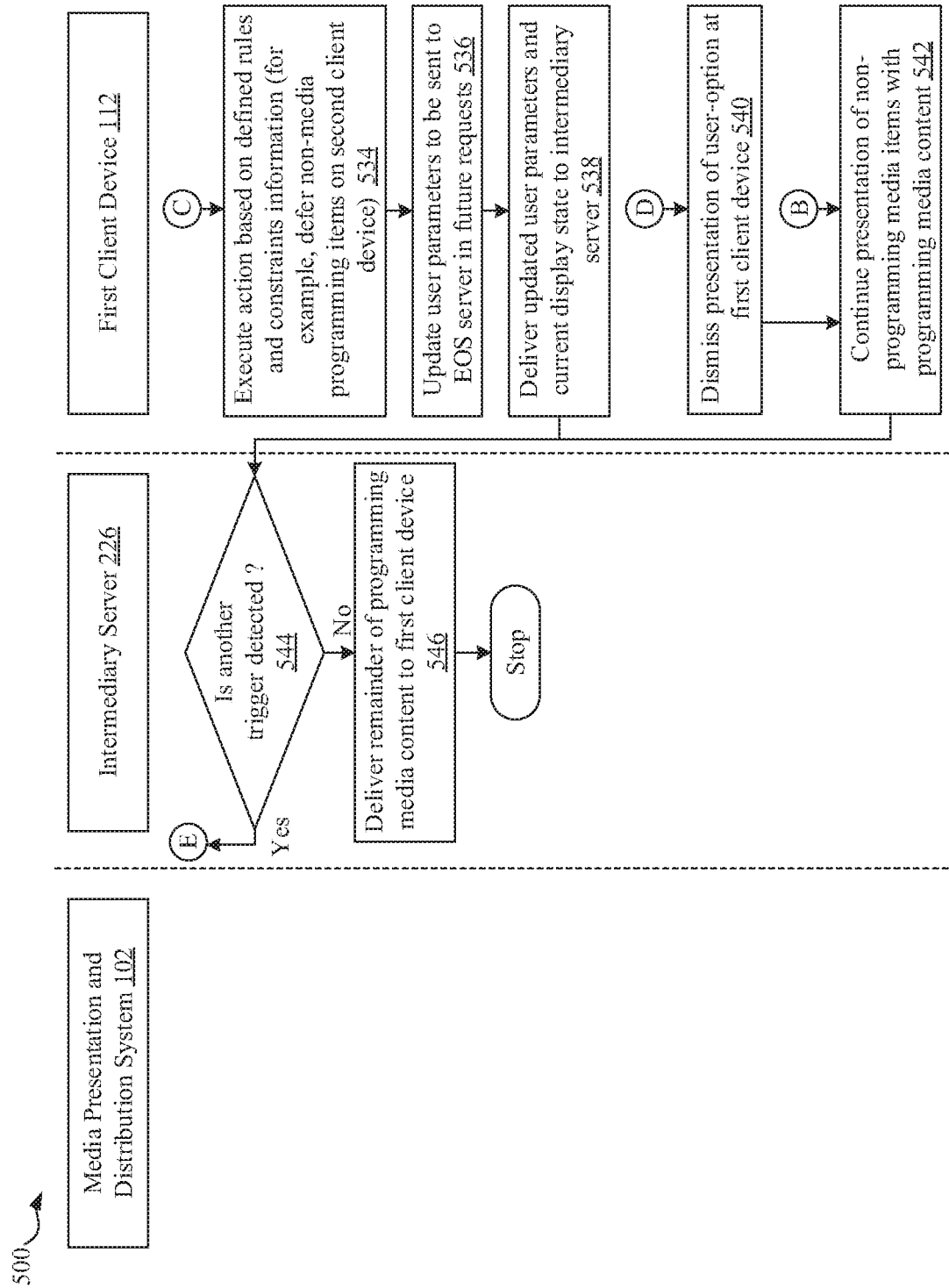

FIGS. 5A, 5B, and 5C depict a flowchart that collectively illustrates exemplary operations for server-side rules-based insertion of non-programming media items in programming media content and presentation of inserted non-programming media items at different client devices, in accordance with an exemplary embodiment of the disclosure. FIGS. 5A, 5B, and 5C are explained in conjunction with FIGS. 1, 2, 3A, 3B, 4A, and 4B. With reference to FIGS. 5A, 5B, and 5C, there is shown a flowchart 500 that includes exemplary operations from 502 through 546. The exemplary operations may start at 502 and proceed to 504.

At 504, a user request for presentation of programming media content may be transmitted to the intermediary server 226. The first client device 112 may be configured to transmit the user request for the presentation of programming media content to the media presentation and distribution system 102.

At 506, the user request for presentation of programming media content may be further transmitted to the media presentation and distribution system 102. The intermediary server 226 may be configured to transmit the user request for the presentation of programming media content to the media presentation and distribution system 102, on behalf of the first client device 112.

At 508, the user request for the presentation of programming media content may be received. The media presentation and distribution system 102 may be configured to receive the user request for the presentation of the programming media content from the intermediary server 226.

At 510, programming media content with embedded identifiers may be delivered to the first client device 112, based on the received user request. The media presentation and distribution system 102 may be configured to deliver the programming media content with the embedded identifiers to the first client device 112.

At 512, embedded identifiers in the programming media content may be detected with the presentation of the programming media content at the first client device 112. The intermediary server 226 may be configured to detect the embedded identifiers in the programming media content with the presentation of the programming media content at the first client device 112.

At 514, a request may be transmitted along with user parameters to EOS server 210 of the media presentation and distribution system 102 for delivery of trigger-related non-programming media items along with rules and constraints information. The intermediary server 226 may be configured to transmit a request along with user parameters to the EOS server 210 of the media presentation and distribution system 102 for delivery of trigger-related non-programming media items along with rules and constraints information. The user parameters may include, but not limited to, a user-preference, a user profile, a user identifier (ID), a device ID, a historic behavioral pattern, a user location, a time zone, demographic details, and a user intent associated with the one or more non-programming media items. Additionally, other targeting parameters may be transmitted along with the user request, which may include, but not limited to, cost per thousand impressions and cost per sales for a non-programming media item.

At 516, a set of non-programming media items may be determined for delivery to the first client device 112 based on the received request. The EOS server 210 at the media presentation and distribution system 102 may be configured to determine a set of non-programming media items (for example, video ads, overlay graphics, etc.) for delivery to the first client device 112 based on the received request.

At 518, rules and constraint information may be defined that determines the presentation of the non-programming media items. The rules server 204 may be configured to define the rules and constrain information that determines the presentation (e.g., behavior, interactivity, placement, presentation, and other attributes) for the non-programming media items at the first client device 112.

At 520, the determined set of non-programming media items and the rules and constraint information may be delivered at the intermediary server 226. The media presentation and distribution system 102 may be configured to deliver the determined set of non-programming media items and the rules and constraint information at the intermediary server 226.

At 522, the determined set of non-programming media items may be inserted in the programming media content based on delivered rules and constraints information. The intermediary server 226 may be configured to insert the determined set of non-programming media items (for example, video ads, overlay graphics, such as bugs, banners, etc.) in the programming media content based on the delivered rules and constraints information.

At 524, the programming media content with the determined set of non-programming media items and the rules and constraint information may be delivered to the first client device 112. The intermediary server 226 may be configured to deliver the programming media content with the determined set of non-programming media items and the rules and constraint information to the first client device 112.

At 526, the programming media content and non-programming media items may be displayed as defined by the rules and constraints information. The first client device 112 may be configured to display the programming media content and the non-programming media items as per definitions in the rules and constraints information.

At 528, it may be determined whether a user-option is defined within the delivered rules and constraints information for one or more of the set of non-programming media items. The first client device 112 102 may be configured to determine whether the user-option (for e.g., defer an ad, watch a pre-roll up front ad, purchase a product/service promoted in the ad, etc.) is defined within the delivered rules and constraints information for one or more of the set of non-programming media items. In a case where the user-option is defined, control may pass to 530. Otherwise, the control may pass to 542.

At 530, a user-option is presented onto the display of the first client device 112. The first client device 112 may be configured to present the user-option onto the display of the first client device 112, during (or prior) to the presentation time of the programming media content or the non-programming media items at the first client device 112.

At 532, it may be further determined whether the presented user-option is selected. The first client device 112 may be configured to determine whether the presented user-option is selected by a user (for example, the user 118). In a case where the presented user-option is selected, control passes to 534. Otherwise, control passes to 540.

At 534, an action may be executed based on the defined rules and constraints information (for example, defer one or more of the set of non-programming media items to the second client device 114 112). The first client device 112 may be configured to execute an action based on the defined rules and constraint information (as further explained in FIGS. 2, 3A, and 3B).

At 536, the user parameters to be sent to the EOS server 210 in future requests may be updated. The first client device 112 may be configured to update the user parameters to be sent to the EOS server 210 in future requests.

At 538, the updated user parameters and current display state may be delivered to the intermediary server 226. The first client device 112 may be configured to deliver the updated user parameters and current display state to the intermediary server 226.

At 540, the presentation of the user-option at the first client device 112 may be dismissed. The first client device 112 may be configured to dismiss the presentation of the user-option at the first client device 112.

At 542, the presentation of one or more of the set of non-programming media items with the programming media content may be continued. The first client device 112 may be configured to continue with the presentation of one or more of the set of non-programming media items with the programming media content.

At 544, it may be determined whether another embedded identifier is detected. The intermediary server 226 may be configured to determine whether another embedded identifier is detected with the presentation of the programming media content. In a case where another embedded identifier is detected, control passes to 514. Otherwise control passes to 546.

At 546, the remainder of the programming media content may be delivered to the first client device 112. The intermediary server 226 may be configured to deliver the remainder of the programming media content to the first client device 112. Control passes to end.

Figure 6:
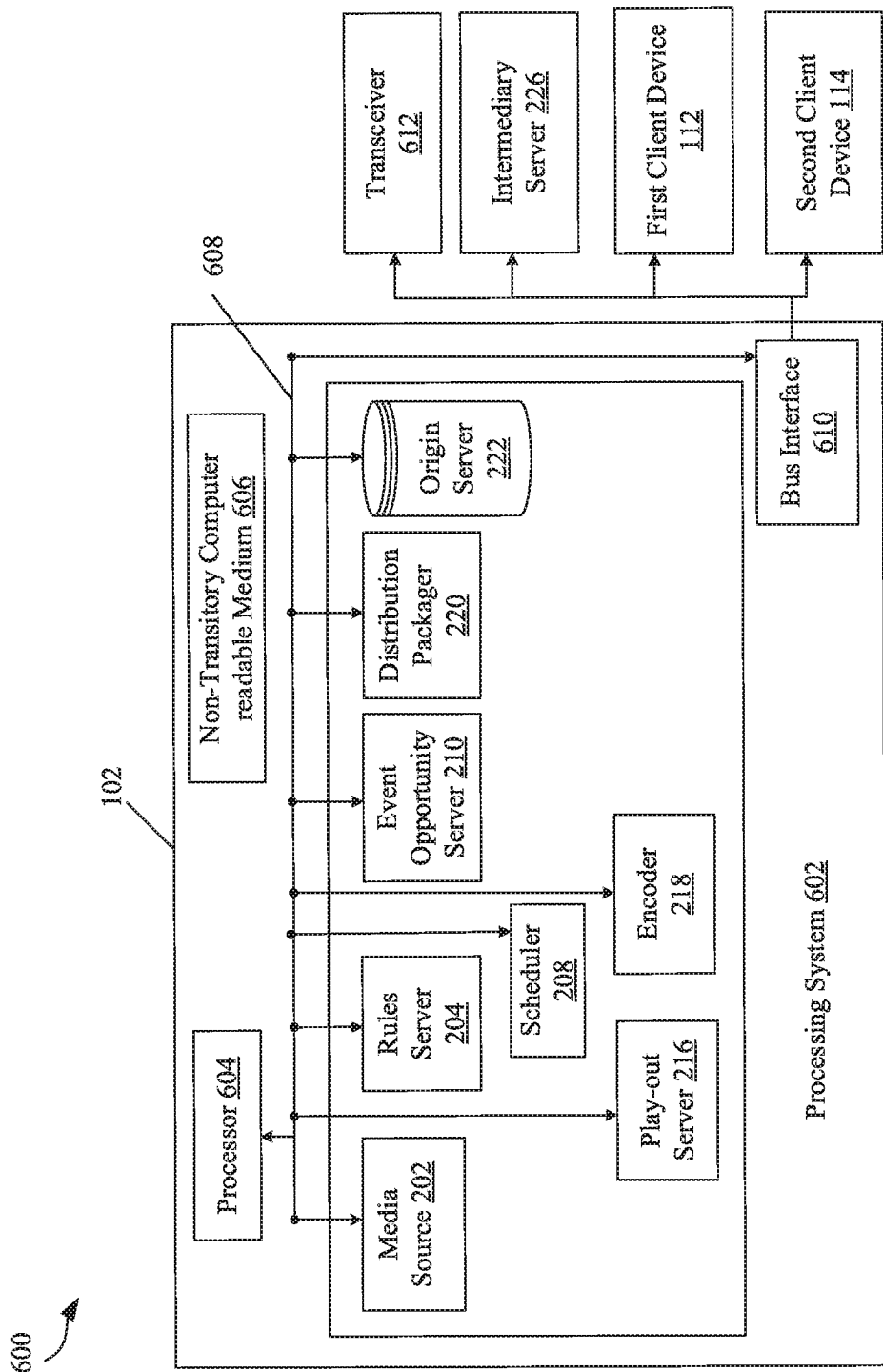
FIG. 6 is a conceptual diagram that illustrates an example of a hardware implementation for a media presentation and distribution system that employs a processing system for server-side rules-based insertion of non-programming media items in programming media content and presentation of inserted non-programming media items at different client devices, in accordance with an exemplary embodiment of the disclosure.

FIG. 6 is a conceptual diagram that illustrates an example of a hardware implementation for a media presentation and distribution system that employs a processing system for server-side rules-based insertion of non-programming media items in programming media content and presentation of inserted non-programming media items at different client devices, in accordance with an exemplary embodiment of the disclosure. With reference to FIG. 6, the hardware implementation is shown by a representation 600 for the media presentation and distribution system 102 for server-assisted insertion of non-programming media items in the programming media content based on rules and constraints information, in accordance with an exemplary embodiment of the disclosure, as described herein. In some examples, the processing system 602 may include one or more hardware processors 604, a non-transitory computer readable medium 606, the media source 202, the scheduler 208, the rules server 204, the play-out server 216, the EOS server 210, the encoder 218, the distribution packager 220, and the origin server 222.

In this example, the media presentation and distribution system 102 that employs the processing system 602 may be implemented with bus architecture, represented generally by the bus 608. The bus 608 may include any number of interconnecting buses and bridges depending on the specific implementation of the media presentation and distribution system 102 and the overall design constraints. The bus 608 links together various circuits including the one or more processors, represented generally by the hardware processor 604, the non-transitory computer-readable media, represented generally by the non-transitory computer readable medium 606, the media source 202, the scheduler 208, the rules server 204, the play-out server 216, the EOS server 210, the encoder 218, the distribution packager 220, the origin server 222 which may be configured to carry out one or more operations or methods described herein. A bus interface 610 provides an interface between the bus 608 and a transceiver 612. The transceiver 612 facilitates communication via the first network 110A (FIG. 1) with various other apparatus, such as the first client device 112, the intermediary server 226, and the second client device 114.

The hardware processor 604 may be configured to manage the bus 608 and general processing, including the execution of a set of instructions stored on the non-transitory computer readable medium 606. The set of instructions, when executed by the hardware processor 604, causes the media presentation and distribution system 102 to execute the various functions described herein for any particular apparatus. The non-transitory computer readable medium 606 may also be used for storing data that is manipulated by the hardware processor 604 when executing the set of instructions. The non-transitory computer readable medium 606 may also be configured to store data for one or more of the media source 202, the scheduler 208, the rules server 204, the play-out server 216, the EOS server 210, the encoder 218, the distribution packager 220, and the origin server 222.

In an aspect of the disclosure, the hardware processor 604, the non-transitory computer readable medium 606, or a combination of both may be configured or otherwise specially programmed to execute the operations or functionality of the media source 202, the scheduler 208, the rules server 204, the play-out server 216, the EOS server 210, the encoder 218, the distribution packager 220, the origin server 222, or various other components described herein. For example, the hardware processor 604, the non-transitory computer readable medium 606, or a combination of both may be configured or otherwise specially programmed to perform the operations and functionality of the media source 202, the scheduler 208, the rules server 204, the play-out server 216, the EOS server 210, the encoder 218, the distribution packager 220, and the origin server 222 as described with respect to FIGS. 1, 2, 3A, 3B, 4A, 4B, 5A, 5B, and 5C.

As utilized herein the terms "circuits" and "circuitry" refer to physical electronic components (i.e. hardware) and any software and/or firmware ("code") which may configure the hardware, be executed by the hardware, and/or otherwise be associated with the hardware. As used herein, for example, a particular processor and memory may comprise a first "circuit" when executing first one or more lines of code and may comprise a second "circuit" when executing second one or more lines of code. As utilized herein, "and/or" means any one or more of the items in the list joined by "and/or". As an example, "x and/or y" means any element of the three-element set {(x), (y), (x, y)}. As another example, "x, y, and/or z" means any element of the seven-element set {(x), (y), (z), (x, y), (x, z), (y, z), (x, y, z)}. As utilized herein, the term "exemplary" means serving as a non-limiting example, instance, or illustration. As utilized herein, the terms "e.g. and for example" set off lists of one or more non-limiting examples, instances, or illustrations. As utilized herein, circuitry is "operable" to perform a function whenever the circuitry comprises the necessary hardware and code (if any is necessary) to perform the function, regardless of whether performance of the function is disabled, or not enabled, by some user-configurable setting.

The terminology used herein is for the purpose of describing particular embodiments only and is not intended to be limiting of embodiments of the present disclosure. As used herein, the singular forms "a", "an" and "the" are intended to include the plural forms as well, unless the context clearly indicates otherwise. It will be further understood that the terms "comprises", "comprising,", "includes" and/or "including", when used herein, specify the presence of stated features, integers, steps, operations, elements, and/or components, but do not preclude the presence or addition of one or more other features, integers, steps, operations, elements, components, and/or groups thereof.

Further, many embodiments are described in terms of sequences of actions to be performed by, for example, elements of a computing device. It will be recognized that various actions described herein can be performed by specific circuits (e.g., application specific integrated circuits (ASICs) and graphical processing units (GPUs)), by program instructions being executed by one or more processors, or by a combination of both. Additionally, these sequence of actions described herein can be considered to be embodied entirely within any non-transitory form of computer readable storage medium having stored therein a corresponding set of computer instructions that upon execution would cause an associated processor to perform the functionality described herein. Thus, the various aspects of the present disclosure may be embodied in a number of different forms, all of which have been contemplated to be within the scope of the claimed subject matter. In addition, for each of the embodiments described herein, the corresponding form of any such embodiments may be described herein as, for example, "logic configured to" perform the described action.

Another embodiment of the present disclosure may provide a non-transitory machine and/or computer readable storage and/or media, having stored thereon, a machine code and/or a computer program having at least one code section executable by a machine and/or a computer, thereby causing the machine and/or computer to perform the steps as described herein to obtain a global workflow sequence.

The present disclosure may also be embodied in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

Further, those of skill in the art will appreciate that the various illustrative logical blocks, modules, circuits, algorithm, and/or steps described in connection with the embodiments disclosed herein may be implemented as electronic hardware, computer software, firmware, or combinations thereof. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The methods, sequences, and/or algorithms described in connection with the embodiments disclosed herein may be embodied directly in firmware, hardware, in a software module executed by a processor, or in a combination thereof. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor.

While the present disclosure has been described with reference to certain embodiments, it will be noted understood by, for example, those skilled in the art that various changes and modification could be made and equivalents may be substituted without departing from the scope of the present disclosure as defined, for example, in the appended claims. In addition, many modifications may be made to adapt a particular situation or material to the teachings of the present disclosure without departing from its scope. The functions, steps and/or actions of the method claims in accordance with the embodiments of the present disclosure described herein need not be performed in any particular order. Furthermore, although elements of the present disclosure may be described or claimed in the singular, the plural is contemplated unless limitation to the singular is explicitly stated. Therefore, it is intended that the present disclosure not be limited to the particular embodiment disclosed, but that the present disclosure will include all embodiments falling within the scope of the appended claims.

What is claimed is:

1. A system, comprising:
at least one circuit in a media presentation and distribution system for rules-based presentation of at least one non-programming media item at a first client device or a second client device that is paired with the first client device, the at least one circuit is configured to:
  receive a user request for delivery of programming media content at the first client device,
    wherein the user request is generated based on a user input, and
    wherein the user request comprises one or more user parameters;
  transmit a media stream that comprises the programming media content along with a plurality of identifiers,
    wherein the transmitted media stream is based on a programming schedule,
    wherein the programming schedule is generated based on the user request, and
    wherein the plurality of identifiers associated with the programming media content in the media stream corresponds to a plurality of metadata triggers;
  receive a request that includes the one or more user parameters from the first client device,
    wherein the request is generated, by the first client device, based on a detection of the plurality of identifiers in the programming media content presented at the first client device;
  determine a set of non-programming media items for delivery to the first client device,
    wherein the set of non-programming media items are delivered based on the one or more user parameters in the request, at least one targeting parameter, and at least one goal associated with a non-programming media item;
  generate rules and constraints information that determines presentation of one or more non-programming media items of the set of non-programming media items;
  instruct delivery of the set of non-programming media items and the rules and constraints information, to the first client device;

determine a plurality of user options such that each of the plurality of user options is associated with a different non-programming media item of the set of non-programming media items;

present at least one user option of the plurality of user options with an associated non-programming media item of the set of programming media items at an interface of the first client device or the second client device, wherein each of the plurality of user options is presented based on a different specified rule of the rules and constraints information and a communication range of the second client device with the first client device; and present a first part of the media stream to the first client device and the remaining part of the media stream to the second client device that is paired with the first client device based on a first user option of the plurality of user options at the first client device, wherein an action is executed based on the presentation of the remaining part of the media stream at the second client device.

2. The system according to claim 1, wherein the media stream corresponds to one of an uncompressed linear media stream, an encoded linear media stream, a video on demand (VOD) media stream, a live media stream, and a combination of a linear, a live, or a VOD media stream.

3. The system according to claim 1, wherein the plurality of identifiers indicate a plurality of insertion points in the programming media content, wherein the plurality of identifiers are transmitted via at least one of in-stream in the media stream or out-of-band beacons that employ an audio segment, a video segment, or recognizable content that represents the plurality of identifiers.

4. The system according to claim 1, wherein the set of non-programming media items comprise at least one of graphical content, textual content, video content, animated content, or other digital content presentable on the first client device.

5. The system according to claim 1, wherein the delivery of the set of non-programming media items and the rules and constraints information is instructed based on a specified format, and wherein the specified format corresponds to at least one of a hypertext transport protocol (HTTP) Live Streaming (HLS) format, Microsoft smooth streaming, Dynamic Adaptive Streaming over HTTP (DASH), Protected HTTP Dynamic Streaming (PHDS), Protected HTTP Live Streaming (PHLS), real time messaging protocol (RTMP), or a digital streaming protocol.

6. The system according to claim 1, wherein the rules and constraints information comprises a set of rules, and wherein the set of rules comprises at least one of a first rule based on which the first client device receives a user input to skip the presentation of a non-programming media item at the first client device, a second rule based on which the non-programming media item is presented for a minimum viewing time after which the at least one user option is enabled for skipping the presentation, a third rule based on which the non-programming media item is presented at the first client device for a cumulative presentation duration, a fourth rule based on which a number of non-programming media items are specified for presentation in a commercial POD, a fifth rule based on which the first client device receives a user input to skip the commercial POD, a sixth rule based on which the first client device receives a user input to select a duration of presentation of the non-programming media item, or an seventh rule based on which the first client device receives a user input to watch a specific number of non-programming media items and collect ad free points based on the specific number of non-programming media items.

7. The system according to claim 1, wherein the rules and constraints information comprises a set of constraints, and wherein the set of constraints comprises at least one of a first constraint based on which the at least one user option to skip a non-programming media item is limited by a specific number of skips, a second constraint based on which the at least one user option to skip the non-programming media item is presented till a first non-programming media item is played at the first client device, a third constraint based on which a minimum viewing time for a non-programming media item is selected based on the at least one goal or the at least one targeting parameter, or a fourth constraint based on which the non-programming media item is presented in accordance with an ad inventory, a number of insertion orders, or a length of program in a duration of the programming media content.

8. The system according to claim 1, wherein the one or more user parameters comprises at least a user-preference, a user profile, a user identifier (ID), a device ID, a historic behavioral pattern, a user location, a time zone, demographic details, or a user intent to engage with a non-programming media item.

9. The system according to claim 1, wherein the at least one targeting parameter comprises at least a cost per thousand impressions (CPM) for a non-programming media item, or a cost per sale (CPS) for the non-programming media item.

10. The system according to claim 1, wherein the at least one goal is at least one of a revenue-based goal, an impressions-based goal, or a sales-based goal.

11. The system according to claim 1, wherein the first client device is content recognition-enabled device, and wherein a content recognition of the media stream at the first client device identifies at least one of an event opportunity identifying marker or a time code associated with one or more of the set of non-programming media items to present the at least one user option.

12. The system according to claim 1, wherein the at least one user option is selected after a defined time duration to defer one or more of the set of non-programming media items to the second client device, and wherein the presentation of the media stream at the first client device is resumed after the deferral of one or more of the set of non-programming media items to the second client device.

13. The system according to claim 1, wherein the at least one user option corresponds to one of an option to a purchase of a product promoted by a non-programming media item, a reverse bid on the product, a social sharing, or a deferral of the product to the second client device.

14. The system according to claim 1, wherein the at least one circuit is further configured to enable a trigger element corresponding to one or more of the set of non-programming media items, and wherein the enabled trigger element is configured to receive a trigger input from a user to avail one or more services associated with one or more of the set of non-programming media items.

15. The system according to claim 14, wherein the trigger element corresponds to a man-machine interface (MMI) located on a dedicated trigger device or a communication device associated with the first client device.

16. The system according to claim 14, wherein the trigger element corresponds to at least one of a user interface (UI) control presented on the first client device or the second client device, a voice input, a gesture input, a touch input, or an input via an interface that in configured to receive a trigger input from a user to avail one or more services associated with one or more of the set of non-programming media items.

17. The system according to claim 1, wherein the at least one circuit is further configured to periodically update the rules and constraints information for one or more of the set of non-programming media items, based on a modification in the one or more user parameters, and
wherein the presentation of the set of non-programming media items is determined based on at least one of a placement attribute, a behavior attribute, a presentation attribute, one or more user attributes, or an interactivity attribute in the rules and constraints information.

18. The system according to claim 1, wherein the programming media content in the media stream is a pre-encoded video-on-demand (VOD) asset, and wherein the at least one circuit is further configured to package the media stream in a specified format for the delivery to the first client device.

19. The system according to claim 1, wherein the programming media content in the media stream is at least one of a compressed linear media content, an encoded linear media content, a video on demand (VOD) media asset, a live media content, and a combination of a linear, a live, or a VOD media content, and
wherein the at least one circuit is further configured to package the media stream in a specified format for the delivery to the first client device.

20. The system according to claim 1, wherein the at least one circuit is further configured to generate a modified version of one or more of the set of non-programming media items, and
wherein the modified version is transmitted for presentation on the first client device prior to the presentation of the programming media content on the first client device.

21. The system according to claim 1, wherein the at least one circuit is further configured to transmit a notification to a first user interface (UI) on the first client device, and
wherein the notification indicates that the at least one non-programming media item is available for a presentation on the second client device.

22. The system according to claim 1, wherein the at least one circuit is further configured to determine a priority of one or more of the set of non-programming media items deferred to the second client device.

23. A system, comprising:
at least one circuit in a first client device for rules-based presentation of at least one non-programming media item at the first client device or a second client device paired with the first client device, the at least one circuit is configured to:
detect a plurality of identifiers in programming media content with presentation of the programming media content at the first client device,
wherein the programming media content is in a media stream received based on a user request from a media presentation and distribution system;
transmit a request to the media presentation and distribution system to deliver a set of non-programming media items to the first client device,
wherein the request is transmitted based on the detection of the plurality of identifiers with the presentation of the programming media content at the first client device;
receive a set of non-programming media items along with rules and constraints information for one or more of the set of non-programming media items,
wherein the set of non-programming media items is received based on the transmitted request to the media presentation and distribution system;
insert the set of non-programming media items in the programming media content based on the rules and constraints information;
determine a plurality of user options such that each of the plurality of user options is associated with a different non-programming media item of the set of non-programming media items;
present at least one user option of the plurality of user options with an associated non-programming media item of the set of non-programming media items at an interface of the first client device or the second client device,
wherein each of the plurality of user options is presented based on a different specified rule of the rules and constraints information and a communication range of the second client device with the first client device, and
wherein the at least one user option for one or more of the set of non-programming media items is presented based on the rules and constraints information for one or more of the set of non-programming media items;
present a first part of the media stream to the first client device and the remaining part of the media stream to the second client device that is paired with the first client device based on a first user option of the plurality of user options at the first client device; and
execute an action based on the presentation of the remaining part of the media stream at the second client device to provide a seamless view of the programming media content at the first client device and increase a likelihood of a user engagement with the one or more of the set of non-programming media items.

24. The system according to claim 23, wherein the at least one circuit is further configured to transmit a user request for delivery of the programming media content at the first client device,
wherein the user request comprises at least one user parameter, and
wherein the interface is at least one of a display, a speaker, or a man-machine interface.

25. The system according to claim 23, wherein the at least one circuit is further configured to receive the media stream that comprises the programming media content with the plurality of identifiers in the programming media content, and
wherein the plurality of identifiers in the programming media content in the media stream corresponds to a plurality of metadata triggers.

26. The system according to claim 23, wherein the plurality of identifiers are embedded within the programming media content.

27. The system according to claim 23, wherein the executed action is at least one of a deferral of one or more of the set of non-programming media items to the second client device, a direct purchase of a product displayed with a non-programming media item, or a skipping of one or more of the set of non-programming media items with presentation of the programming media content at the first client device.

\* \* \* \* \*